US011947572B2

(12) United States Patent
Pomerantsev

(10) Patent No.: US 11,947,572 B2
(45) Date of Patent: Apr. 2, 2024

(54) METHOD AND SYSTEM FOR CLUSTERING EXECUTABLE FILES

(71) Applicant: F.A.C.C.T. NETWORK SECURITY LLC, Moscow (RU)

(72) Inventor: Ilia Sergeevich Pomerantsev, Moscow Region (RU)

(73) Assignee: GROUP IB TDS, LTD, Moscow (RU)

( * ) Notice: Subject to any disclaimer, the term of this patent is extended or adjusted under 35 U.S.C. 154(b) by 45 days.

(21) Appl. No.: 17/486,428

(22) Filed: Sep. 27, 2021

(65) Prior Publication Data

US 2022/0309077 A1 Sep. 29, 2022

(30) Foreign Application Priority Data

Mar. 29, 2021 (RU) .................. 2021108261

(51) Int. Cl.
*G06F 16/00* (2019.01)
*G06F 16/11* (2019.01)
*G06F 16/28* (2019.01)

(52) U.S. Cl.
CPC .......... *G06F 16/285* (2019.01); *G06F 16/116* (2019.01)

(58) Field of Classification Search
CPC .................................................. G06F 16/285
USPC .............................................. 707/737, 825
See application file for complete search history.

(56) References Cited

U.S. PATENT DOCUMENTS

| 6,928,434 | B1 | 8/2005 | Choi et al. |
| 7,225,343 | B1 | 5/2007 | Honig et al. |
| 7,383,581 | B1 | 6/2008 | Moore et al. |
| 7,496,628 | B2 | 2/2009 | Arnold et al. |
| 7,712,136 | B2 | 5/2010 | Sprosts et al. |
| 7,730,040 | B2 | 6/2010 | Reasor et al. |

(Continued)

FOREIGN PATENT DOCUMENTS

| AU | 2017203008 B2 | 3/2019 |
| CN | 103491205 A | 1/2014 |

(Continued)

OTHER PUBLICATIONS

Notice of Allowance with regard to the U.S. Appl. No. 17/087,775 dated Nov. 15, 2021.

(Continued)

*Primary Examiner* — Alexandria Y Bromell
(74) *Attorney, Agent, or Firm* — BCF LLP

(57) ABSTRACT

A method and a system for clustering executable files are provided. The method comprises: obtaining a plurality of executable files; for each executable file: (i) detecting repeat sequences of commands of a predetermined length in a given executable file; (ii) determining at least one frequently occurring sequence of the repeat sequences in the given executable file; and based on the at least one frequently occurring sequence of commands, attributing the given executable file to a respective family; iteratively executing the detecting, the determining, and the attributing until one of: all of the plurality of executable files are attributed to at least one respective family, and until un-attributed files of the plurality of executable files do not contain any repeat sequences of commands; and responsive to presence of un-attributed files, attributing each of the un-attributed files of the plurality of executable files to a separate family.

18 Claims, 6 Drawing Sheets

(56) References Cited

U.S. PATENT DOCUMENTS

| | | | |
|---|---|---|---|
| 7,865,953 B1 | 1/2011 | Hsieh et al. | |
| 7,958,555 B1 | 6/2011 | Chen et al. | |
| 7,984,500 B1 | 7/2011 | Khanna et al. | |
| 8,132,250 B2 | 3/2012 | Judge et al. | |
| 8,151,341 B1 | 4/2012 | Gudov | |
| 8,255,532 B2 | 8/2012 | Smith-Mickelson et al. | |
| 8,260,914 B1 | 9/2012 | Ranjan | |
| 8,285,830 B1 | 10/2012 | Stout et al. | |
| 8,402,543 B1 | 3/2013 | Ranjan et al. | |
| 8,448,245 B2 | 5/2013 | Banerjee et al. | |
| 8,532,382 B1 | 9/2013 | Ioffe | |
| 8,539,582 B1 | 9/2013 | Aziz et al. | |
| 8,555,388 B1 | 10/2013 | Wang et al. | |
| 8,561,177 B1 | 10/2013 | Aziz et al. | |
| 8,600,993 B1 | 12/2013 | Gupta et al. | |
| 8,612,463 B2 | 12/2013 | Brdiczka et al. | |
| 8,625,033 B1 | 1/2014 | Marwood et al. | |
| 8,635,696 B1 | 1/2014 | Aziz | |
| 8,650,080 B2 | 2/2014 | O'Connell et al. | |
| 8,660,296 B1 | 2/2014 | Ioffe | |
| 8,677,472 B1 | 3/2014 | Dotan et al. | |
| 8,683,595 B1 | 3/2014 | Barker | |
| 8,776,229 B1 | 7/2014 | Aziz | |
| 8,850,571 B2 | 9/2014 | Staniford et al. | |
| 8,856,937 B1 | 10/2014 | Wüest et al. | |
| 8,972,412 B1 | 3/2015 | Christian et al. | |
| 8,984,640 B1 | 3/2015 | Emigh et al. | |
| 9,026,840 B1 | 5/2015 | Kim | |
| 9,060,018 B1 | 6/2015 | Yu et al. | |
| 9,165,142 B1 | 10/2015 | Sanders et al. | |
| 9,210,111 B2 | 12/2015 | Chasin et al. | |
| 9,215,239 B1 | 12/2015 | Wang et al. | |
| 9,223,972 B1 | 12/2015 | Vincent et al. | |
| 9,253,208 B1 | 2/2016 | Koshelev | |
| 9,330,258 B1 | 5/2016 | Satish et al. | |
| 9,338,181 B1 | 5/2016 | Burns et al. | |
| 9,357,469 B2 | 5/2016 | Smith et al. | |
| 9,456,000 B1 | 9/2016 | Spiro et al. | |
| 9,516,053 B1 * | 12/2016 | Muddu | G06F 3/0484 |
| | | | 707/707 |
| 9,654,593 B2 | 5/2017 | Garg et al. | |
| 9,723,344 B1 | 8/2017 | Granström et al. | |
| 9,736,178 B1 | 8/2017 | Ashley | |
| 9,747,446 B1 | 8/2017 | Pidathala et al. | |
| 9,917,852 B1 | 3/2018 | Xu et al. | |
| 9,934,376 B1 | 4/2018 | Ismael | |
| 10,148,685 B2 | 12/2018 | Hassanzadeh et al. | |
| 10,284,574 B1 | 5/2019 | Aziz et al. | |
| 10,467,411 B1 | 11/2019 | Pidathala et al. | |
| 10,546,143 B1 | 1/2020 | Wesson | |
| 10,783,247 B1 | 9/2020 | Steinfadt et al. | |
| 10,990,674 B2 | 4/2021 | Srinivasagopalan et al. | |
| 11,270,000 B1 * | 3/2022 | Chiang | G06F 21/565 |
| | | | 707/707 |
| 11,663,405 B2 * | 5/2023 | Wilson | G06N 20/00 |
| | | | 706/12 |
| 2002/0161862 A1 | 10/2002 | Horvitz | |
| 2003/0009696 A1 | 1/2003 | Bunker et al. | |
| 2006/0021029 A1 | 1/2006 | Brickell et al. | |
| 2006/0037080 A1 | 2/2006 | Maloof | |
| 2006/0074858 A1 | 4/2006 | Etzold et al. | |
| 2006/0107321 A1 | 5/2006 | Tzadikario | |
| 2006/0224898 A1 | 10/2006 | Ahmed | |
| 2006/0253582 A1 | 11/2006 | Dixon et al. | |
| 2007/0019543 A1 | 1/2007 | Wei et al. | |
| 2007/0239999 A1 | 10/2007 | Honig et al. | |
| 2008/0172651 A1 | 7/2008 | Davia | |
| 2009/0138342 A1 | 5/2009 | Otto et al. | |
| 2009/0281852 A1 | 11/2009 | Abhari et al. | |
| 2009/0292925 A1 | 11/2009 | Meisel | |
| 2010/0011124 A1 | 1/2010 | Wei et al. | |
| 2010/0037314 A1 | 2/2010 | Perdisci et al. | |
| 2010/0076857 A1 | 3/2010 | Deo et al. | |
| 2010/0115620 A1 | 5/2010 | Alme | |
| 2010/0115621 A1 | 5/2010 | Staniford et al. | |
| 2010/0191737 A1 | 7/2010 | Friedman et al. | |
| 2010/0205665 A1 | 8/2010 | Komili et al. | |
| 2010/0235918 A1 | 9/2010 | Mizrahi et al. | |
| 2011/0222787 A1 | 9/2011 | Thiemert et al. | |
| 2012/0030293 A1 | 2/2012 | Bobotek | |
| 2012/0079596 A1 | 3/2012 | Thomas et al. | |
| 2012/0087583 A1 | 4/2012 | Yang et al. | |
| 2012/0158626 A1 | 6/2012 | Zhu et al. | |
| 2012/0233656 A1 | 9/2012 | Rieschick et al. | |
| 2012/0291125 A1 | 11/2012 | Maria | |
| 2013/0086677 A1 | 4/2013 | Ma et al. | |
| 2013/0103666 A1 | 4/2013 | Sandberg et al. | |
| 2013/0111591 A1 | 5/2013 | Topan et al. | |
| 2013/0117848 A1 | 5/2013 | Golshan et al. | |
| 2013/0191364 A1 | 7/2013 | Kamel et al. | |
| 2013/0227691 A1 | 8/2013 | Aziz et al. | |
| 2013/0263264 A1 | 10/2013 | Klein et al. | |
| 2013/0297619 A1 | 11/2013 | Chandrasekaran et al. | |
| 2013/0340080 A1 | 12/2013 | Gostev et al. | |
| 2014/0033307 A1 | 1/2014 | Schmidtler | |
| 2014/0058854 A1 | 2/2014 | Ranganath et al. | |
| 2014/0082730 A1 | 3/2014 | Vashist et al. | |
| 2014/0173287 A1 | 6/2014 | Mizunuma | |
| 2014/0310811 A1 | 10/2014 | Hentunen | |
| 2015/0007250 A1 | 1/2015 | Dicato, Jr. et al. | |
| 2015/0049547 A1 | 2/2015 | Kim | |
| 2015/0067839 A1 | 3/2015 | Wardman et al. | |
| 2015/0163242 A1 | 6/2015 | Laidlaw et al. | |
| 2015/0170312 A1 | 6/2015 | Mehta et al. | |
| 2015/0178306 A1 | 6/2015 | Yang et al. | |
| 2015/0200963 A1 | 7/2015 | Geng et al. | |
| 2015/0220735 A1 | 8/2015 | Paithane et al. | |
| 2015/0227364 A1 | 8/2015 | Asadullah et al. | |
| 2015/0295945 A1 | 10/2015 | Canzanese et al. | |
| 2015/0310010 A1 * | 10/2015 | Brenner | G06F 16/5866 |
| | | | 707/730 |
| 2015/0356291 A1 | 12/2015 | Zakorzhevsky et al. | |
| 2015/0363791 A1 | 12/2015 | Raz et al. | |
| 2015/0381654 A1 | 12/2015 | Wang et al. | |
| 2016/0036837 A1 | 2/2016 | Jain et al. | |
| 2016/0036838 A1 | 2/2016 | Jain et al. | |
| 2016/0044054 A1 | 2/2016 | Stiansen et al. | |
| 2016/0055490 A1 | 2/2016 | Keren et al. | |
| 2016/0057159 A1 | 2/2016 | Yin et al. | |
| 2016/0065595 A1 | 3/2016 | Kim et al. | |
| 2016/0112445 A1 | 4/2016 | Abramowitz | |
| 2016/0127388 A1 | 5/2016 | Cabot et al. | |
| 2016/0127907 A1 | 5/2016 | Baxley et al. | |
| 2016/0132521 A1 | 5/2016 | Reininger et al. | |
| 2016/0149943 A1 | 5/2016 | Kaloroumakis et al. | |
| 2016/0191243 A1 | 6/2016 | Manning | |
| 2016/0205122 A1 | 7/2016 | Bassett | |
| 2016/0205123 A1 | 7/2016 | Almurayh et al. | |
| 2016/0226894 A1 | 8/2016 | Lee et al. | |
| 2016/0253679 A1 | 9/2016 | Venkatraman et al. | |
| 2016/0261628 A1 | 9/2016 | Doron et al. | |
| 2016/0267179 A1 | 9/2016 | Mei et al. | |
| 2016/0285971 A1 | 9/2016 | Nguyen et al. | |
| 2016/0306974 A1 | 10/2016 | Turgeman et al. | |
| 2016/0359679 A1 | 12/2016 | Parandehgheibi et al. | |
| 2017/0006045 A1 | 1/2017 | Kivva et al. | |
| 2017/0034211 A1 | 2/2017 | Buergi et al. | |
| 2017/0111377 A1 | 4/2017 | Park et al. | |
| 2017/0134401 A1 | 5/2017 | Medvedovsky et al. | |
| 2017/0142144 A1 | 5/2017 | Weinberger et al. | |
| 2017/0149813 A1 | 5/2017 | Wright et al. | |
| 2017/0171230 A1 | 6/2017 | Leiderfarb et al. | |
| 2017/0200457 A1 | 7/2017 | Chai et al. | |
| 2017/0230401 A1 | 8/2017 | Ahmed et al. | |
| 2017/0244735 A1 | 8/2017 | Visbal et al. | |
| 2017/0250972 A1 | 8/2017 | Ronda et al. | |
| 2017/0251003 A1 | 8/2017 | Rostami-Hesarsorkh et al. | |
| 2017/0262633 A1 | 9/2017 | Miserendino et al. | |
| 2017/0272471 A1 | 9/2017 | Veeramachaneni et al. | |
| 2017/0279818 A1 | 9/2017 | Milazzo et al. | |
| 2017/0286544 A1 | 10/2017 | Hunt et al. | |
| 2017/0289187 A1 | 10/2017 | Noel et al. | |
| 2017/0295157 A1 | 10/2017 | Chavez et al. | |
| 2017/0295187 A1 | 10/2017 | Havelka et al. | |

(56) References Cited

U.S. PATENT DOCUMENTS

| | | |
|---|---|---|
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0165452 A1 | 6/2018 | Sun et al. |
| 2018/0268464 A1 | 9/2018 | Li |
| 2018/0307832 A1 | 10/2018 | Ijiro et al. |
| 2018/0309787 A1 | 10/2018 | Evron et al. |
| 2018/0365420 A1 | 12/2018 | Krylov et al. |
| 2019/0005239 A1 | 1/2019 | Park et al. |
| 2019/0089737 A1 | 3/2019 | Shayevitz et al. |
| 2019/0114423 A1 | 4/2019 | Chistyakov et al. |
| 2019/0158525 A1 | 5/2019 | Rostami-Hesarsorkh et al. |
| 2019/0207973 A1 | 7/2019 | Peng |
| 2019/0230098 A1 | 7/2019 | Navarro |
| 2019/0294720 A1* | 9/2019 | Beringer ............ G06F 16/26 707/707 |
| 2019/0373005 A1 | 12/2019 | Bassett |
| 2020/0092306 A1 | 3/2020 | Jusko et al. |
| 2020/0134702 A1 | 4/2020 | Li |
| 2020/0302058 A1 | 9/2020 | Kenyon et al. |

FOREIGN PATENT DOCUMENTS

| | | |
|---|---|---|
| CN | 104504307 A | 4/2015 |
| CN | 103020494 B | 6/2015 |
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392019 A | 11/2017 |
| CN | 107392456 A | 11/2017 |
| EP | 1160646 A2 | 12/2001 |
| EP | 2916256 A1 | 9/2015 |
| EP | 2410452 B1 | 1/2016 |
| EP | 2743854 B1 | 12/2018 |
| EP | 2946331 B1 | 8/2019 |
| GB | 2425622 A | 11/2006 |
| GB | 2493514 A | 2/2013 |
| KR | 10-2007-0049514 A | 5/2007 |
| KR | 20120090131 A | 8/2012 |
| KR | 10-1514984 B1 | 4/2015 |
| RU | 91213 U1 | 1/2010 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2580036 C2 | 4/2016 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2654146 C1 | 5/2018 |
| RU | 2670906 C9 | 12/2018 |
| RU | 2681699 C1 | 3/2019 |
| RU | 2702269 C1 | 10/2019 |
| RU | 2706883 C1 | 11/2019 |
| RU | 2706896 C1 | 11/2019 |
| RU | 2708356 C1 | 12/2019 |
| RU | 2728497 C1 | 7/2020 |
| RU | 2728498 C1 | 7/2020 |
| RU | 2738344 C1 | 12/2020 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2017/111835 A1 | 6/2017 |
| WO | 2019/010182 A1 | 1/2019 |

OTHER PUBLICATIONS

English Abstract of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Search Report with regard to RU Patent Application No. 2021108261 completed Feb. 28, 2022.
English Abstract for RU91213 retrieved on Espacenet on Mar. 25, 2022.
Office Action with regard to the counterpart U.S. Appl. No. 15/707,641 dated Apr. 25, 2019.

(56) References Cited

OTHER PUBLICATIONS

English Translation of CN106713312, ©Questel—FAMPAT, Jul. 17, 2019.
English Translation of CN105897714, ©Questel—FAMPAT, Jul. 17, 2019.
English Translation of CN106506435, ©Questel—FAMPAT, Jul. 26, 2019.
English Translation of CN107392456, ©Questel—FAMPAT, Jul. 29, 2019.
English Translation of CN103491205, ©Questel—FAMPAT, Jul. 29, 2019.
English Translation of CN106131016, ©Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Search Report with regard to the counterpart RU Patent Application No. 2018144708 completed Aug. 16, 2019.
English Translation of KR10-2007-0049514 (Description, Claims) retrieved on Espacenet on Oct. 16, 2019.
Search Report with regard to the counterpart RU Patent Application No. 2018147431 completed Aug. 15, 2019.
English Abstract of KR10-1514984 retrieved on Espacenet on Oct. 15, 2019.
Office Action with regard to the counterpart U.S. Appl. No. 16/261,854 dated Oct. 21, 2019.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 {Year: 2005}—cited by Examiner in the Notice of Allowance with regard to the counterpart U.S. Appl. No. 15/707,641.
Office Action with regard to the counterpart U.S. Appl. No. 15/858,013 dated Nov. 22, 2019.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 dated Apr. 6, 2020.
Notice of Allowance with regard to the counterpart U.S. Appl. No. 15/858,013 dated May 8, 2020.
Office Action with regard to the counterpart U.S. Appl. No. 16/270,341 dated May 27, 2020.
Notice of Allowance with regard to the counterpart U.S. Appl. No. 15/858,013 dated Jun. 10, 2020.
Office Action with regard to the counterpart U.S. Appl. No. 16/249,004 dated Apr. 23, 2021.
Search Report with regard to the counterpart Patent Application No. NL 2029433 completed Oct. 18, 2022.
Singh Jagsir et al., "A survey on machine learning-based malware detection in executable files", Journal of Systems Architecture, Elsevier BV, NL, Aug. 2020, pp. 1-24.
Notice of Allowance with regard to the U.S. Appl. No. 17/077,132 dated Oct. 11, 2022.
Search Report with regard to RU Patent Application No. 2020110068 completed Sep. 8, 2020.
International Search Report with regard to PCT/RU2020/000140 dated Nov. 19, 2020.
Search Report with regard to RU Patent Application No. 2020107922 completed Mar. 24, 2020.
International Search Report with regard to PCT/RU2020/000089 dated Oct. 29, 2020.
English Abstract for CN107392019 retrieved on Espacenet on Dec. 2, 2021.
Search Report with regard to the NL Patent Application No. 2027556 completed Sep. 29, 2021.
Phuong, "On Preempting Advanced Persistent Threats Using Probabilistic Graphical Models", arxiv.org, Cornell University Library, 201 Olin Library Cornell University Ithaca, NY 14853, Mar. 2019, pp. 1-14.
Manuel et al., "A survey on automated dynamic malware-analysis techniques and tools", ACM Computing Surveys, vol. 44, No. 2, Feb. 2012, pp. 1-49.
Tokhtabayev et al., "Malware Analysis and Detection via Activity Trees in User-Dependent Environment", Aug. 2017, ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 211-222.
Office Action with regard to the counterpart U.S. Appl. No. 17/178,320 dated Apr. 19, 2023.
English Abstract for KR20120090131 retrieved on Espacenet on Apr. 21, 2023.
Github / Linguist, https://github.com/github/linguist accessed on Sep. 24, 2021, pdf 6 pages.
Blackducksoftware / Ohcount, https://github.com/blackducksoftware/ohcount accessed on Sep. 24, 2021, pdf 4 pages.
Search Report with regard to the RU Patent Application No. 2020126232 completed Jan. 28, 2021.
Rudman et al., "Dridex: Analysis of the traffic and automatic generation of IOCs", IEEE, 2016, https://digifors.cs.up.ac.za/issa/2016/Proceedings/Full/paper%2041.pdf, pp. 77-84.
Grant Decision and Search Report with regard to the RU Patent Application No. 2019139630 completed Jun. 26, 2020.
Dauber et al., "Stylometric Authorship Attribution in Collaborative Documents", Materials of International Conference on Cyber Security Cryptography and Machine Learning (CSCML) 2017, pp. 115-135.
Afroz, Deception in Authorship Attribution, Drexel University, 2013, http://hdl.handle.net/1860/4431, pp. 1-91.
Granin, "Text Analyzer", https://habr.com/ru/post/114186/ and Machine Translation into English by Yandex Translate on Oct. 21, 2020, pdf 32 pages.
"Authorship Attribution Program by NeoNeuro", https://neoneuro.com accessed Jul. 31, 2020, pdf 5 pages.
"Tools for Software Analysis and Forensic Engineering, S.A.F.E.", https://www.safe-corp.com/index.htm accessed Jul. 31, 2020, pdf 2 pages.
English Abstract for CN 103020494 retrieved on Espacenet on Oct. 21, 2020.
Grant Decision and Search Report with regard to the RU Patent Application No. 2019139628 completed Jun. 26, 2020.
Search Report with regard to EP Patent Application No. EP20924272 completed Nov. 30, 2022.
Chandramohan et al., "A scalable approach for malware detection through bounded feature space behavior modeling", 28th IEEE/ACM International Conference on Automated Software Engineering (ASE), IEEE, 2013, pp. 312-322.
Alahmadi et al., "MalClassifier: Malware family classification using network flow sequence behaviour", APWG Symposium on Electronic Crime Research (ECRIME), IEEE, 2018, pp. 1-13.
Galal et al., "Behavior-based features model for malware detection", Journal of Computer Virology and Hacking Techniques, Springer Paris, vol. 12, No. 2, 2015, pp. 59-67.
Pirscoveanu et al., "Analysis of malware behavior: Type classification using machine learning", International Conference on Cyber Situational Awareness, Data Analytics and Assessment (CYBERSA), Centre for Multidisciplinary Research, Innovation and Collaboration, 2015, pp. 1-7.
Notice of Allowance with regard to the counterpart U.S. Appl. No. 17/178,320 dated Oct. 20, 2023.

(56) References Cited

OTHER PUBLICATIONS

Lajevardi et al., "A semantic-based correlation approach for detecting hybrid and low-level APTs", Future Generation Computer Systems 96(1), Feb. 2019, 25 pages.

* cited by examiner

METHOD AND SYSTEM FOR CLUSTERING EXECUTABLE FILES

CROSS-REFERENCE

The present application claims priority to a Russian Application No.: 2021/108,261 filed on Mar. 29, 2021 and entitled "METHOD AND SYSTEM FOR CLUSTERING EXECUTABLE FILES", the content of which is incorporated herein by reference in its entirety.

FIELD

The present technology relates generally to the field of cybersecurity; and in particular, to methods and systems for clustering executable files.

BACKGROUND

Professional cybercriminals may develop an attack strategy and further rarely change it, using the same malware for a long time with insignificant modifications.

At the same time, the developers of malicious SW (MSW) creating tools for cybercriminals may use the same software solution, for example, a function implementing cryptographic algorithm, for a long time in different samples of MSW created for different cybercriminal groups and associated with different MSW families.

Therefore, in the field of cybersecurity, it may be important to know with which MSW family a given sample of MSW is affiliated and/or who is an author (or a group thereof) of the given sample of MSW.

Signature analysis is a well-known method for detection of MSW. This method is based on the search of a unique sequence of bytes in files, i.e., a respective signature therein which is indicative of a specific MSW. In each new sample of MSW, the code analysis could be carried out by antivirus laboratory specialists and the results thereof are used to determine the signature of the given new MSW. The resulting signature is placed into a virus signature database, to which an antivirus program may be provided access, thereby allowing for detection of the given MSW by the antivirus.

This method may be known to certain cybercriminals. Therefore, nearly all types of modern MSW are constantly modified in various fashions such that the files of every next version of the MSW acquire, from the perspective of anti-virus signature analyzers, new properties. In this case, when current signature databases are used for detecting the MSW, new versions thereof may be unrecognizable as malicious, which will thus allow cybercriminals to perform their activities with increased secrecy.

Besides the modifications, the obfuscation approach is widely used. It is a technique of modifying a source text or executable code of a software program such that functionality thereof is preserved, however, analyzing it to determine operation algorithms may become more complicated. The above-mentioned modifications to the MSW may be performed either by a human or automatically, e.g., by so called polymorphic generator, which may be part of a malware.

At the same time, the basic functions of the MSW may not be significantly altered. After the modification, the malicious software will "look" differently only for signature analyzers, its code may be obfuscated and cannot be analyzed by a human; however, the set of operating functions that were performed by said MSW before the modification is likely to remain unchanged after the modification.

Certain prior art approaches have been proposed to address the above-identified technical problem of determining affiliation of the MSW.

Russian Patent No.: 2,728,497-C1 issued on Jul. 29, 2020, assigned to Group IB TDS, and entitled "METHOD AND SYSTEM FOR DETERMINING BELONGING OF SOFTWARE BY ITS MACHINE CODE" discloses a method of determining membership of a software (SW) to a certain family of programs based on its machine code, in which a file is obtained, comprising a machine code SW; determining format of obtained file; retrieving and storing code of functions present in the obtained file; deleting from stored code functions, which are library; selecting in each function a command; selecting "action, argument" pair in each command; converting each pair "action, argument" to number; storing, separately for each selected function, the obtained sequence of numbers; accumulating a predetermined number of machine code analysis results and detecting repeated sequences of numbers (patterns); for each detected pattern, calculating a parameter characterizing its frequency; based on the calculated set of parameters, the classifier is trained to determine the SW membership by the "action, argument" pairs sequence; trained classifier is used for subsequent determination of membership of SW to a certain family of programs.

United States Patent Application Publication No.: 2015/178,306-A1 published on Jun. 25, 2015, assigned to Tencent Technology Shenzhen Co. Ltd., and entitled "METHOD AND APPARATUS FOR CLUSTERING PORTABLE EXECUTABLE FILES" discloses a method and apparatus for clustering portable executable (PE) files. The method comprises: extracting PE file characteristics from a PE file; generating a PE file identifier for the PE file based on the PE file characteristics; and clustering the PE file base on the PE file identifier. The apparatus comprises an extraction module, a generation module, and a clustering module. In accordance with embodiments of the present invention, a PE file identifier is generated for the PE file based on PE file characteristics extracted from the PE file, and the PE files are clustered based on the PE file identifier. Thus, random PE files are clustered into ordered classes, and the number of PE files to be processed by the antivirus clients and servers are reduced, which reduces storage costs, improves matching efficiency and the ability to detect and combat PE virus variants.

European Patent No.: 2,743,854-B1 issued on Dec. 26, 2018, assigned to Tencent Technology Shenzhen Co. Ltd., and entitled "CLUSTERING PROCESSING METHOD AND DEVICE FOR VIRUS FILES" discloses a method for clustering portable executable (PE) files, including virus files, comprising: performing static analysis of binary data of virus files to be classified to obtain portable data of the executable structure of virus files; comparing data of the portable executable structure of virus files to be classified, and classifying virus files having PE structure data satisfying a predetermined similarity criterion into the same category; and performing secondary clustering of virus files in each of the categories classified at the previous step.

European Patent No.: 2,946,331-B1 issued on Aug. 28, 2019, assigned to NortonLifeLock Inc., and entitled "Classifying samples using clustering" discloses a classifying an unlabeled sample using clustering. A set of samples containing labeled and unlabeled samples is established. Values of features are gathered from the samples contained in the datasets and a subset of features are selected. The labeled and unlabeled samples are clustered together based on similarity of the gathered values for the selected subset of features to produce a set of clusters, each cluster having a subset of samples from the set of samples. The selecting and clustering steps are recursively iterated on the subset of samples in each cluster in the set of clusters until at least one stopping condition is reached. The iterations produce a cluster having a labeled sample and an unlabeled sample. A label is propagated from the labeled sample in the cluster to the unlabeled sample in the cluster to classify the unlabeled sample.

SUMMARY

It is an object of the present technology to ameliorate at least some inconveniences associated with the prior art.

Developers of the present technology have realized that, although obfuscated for signature analyzers, the MSW may be more effectively identified based on sequence of commands executed thereby. Thus, various non-limiting embodiments of the present technology are directed to detect in one of a source code or machine code of a given piece of MSW a specific sequence of commands it is configured to execute, and based thereon, determine if the given piece of MSW is affiliated with a known family of MSW and/or group of authors thereof.

More specifically, in accordance with a first broad aspect of the present technology, there is provided a method for clustering executable files implemented on a computer device. The method comprises: obtaining, by the computer device, a plurality of executable files; determining, by the computer device, a file format of each executable file of the plurality of executable files; for each file format:(i) detecting, by the computer device, repeat sequences of commands of a predetermined length in a given one of the plurality of executable files; (ii) determining, by the computer device, at least one frequently occurring sequence of the repeat sequences of commands in the given one of the plurality of executable files; and based on the at least one frequently occurring sequence of commands, attributing, by the computer device, the given one of the plurality of executable files to a respective family; iteratively executing, by the computer device, the detecting, the determining, and the attributing until one of: all of the plurality of executable files are attributed to at least one respective family, and until un-attributed files of the plurality of executable files do not contain any repeat sequences of commands; and in response to presence of un-attributed files of the plurality of executable files, attributing each of the un-attributed files of the plurality of executable files to a separate family.

In some implementations of the method, the method further comprises determining the predetermined length of a given repeat sequence based on a number of executable files where the given sequence was detected.

In some implementations of the method, the predetermined length of a given repeat sequence is fixed.

In some implementations of the method, the detecting the repeat sequences further comprises determining a respective entropy value of each one of the repeat sequences and selecting only those thereof for further processing whose respective entropy values exceed a predetermined entropy value threshold.

In some implementations of the method, the at least one frequently occurring sequence is determined by searching therefor in a hash table.

In some implementations of the method, the attributing the given one of the plurality of executable files to the respective family is based on a result of calculating, for the given executable file, a respective value of a weighting function comprising a sum of coefficients associated with each one of at least two frequently occurring sequences of commands detected in the given executable file.

In some implementations of the method, each coefficient of the weighing function is calculated as a respective ratio of a number of executable files where a given frequently occurring sequence is present at least once, to a total number of executable files in the plurality of executable files.

In some implementations of the method, executable files not containing any repeat sequences are not attributed to any family.

In accordance with a second broad aspect of the present technology, there is provided a method for clustering executable files implemented on a computer device. The method comprises: obtaining, by the computer device, a plurality of executable files; determining, by the computer device, a file format of each executable file of the plurality of executable files; launching, by the computer device, based on a respective file format, each executable file of the plurality of executable files in a respective isolated environment to determine a respective machine code of each one of the plurality of executable files; generating, by the computer device, based on the respective machine code, a respective sample code by deleting therefrom portions non-indicative of a given executable file being affiliated with any family; detecting, by the computer device, in the respective sample code associated with the given executable file, repeat sequences of commands of a predetermined length; determining, by the computer device, at least one frequently occurring sequence of the repeat sequences of commands in the respective sample code; based on the at least one frequently occurring sequence, attributing, by the computer device, the given executable file to a respective family; iteratively executing, by the computer device, the detecting, the determining, and the attributing until one of: all of the plurality of executable files are attributed to at least one respective family, and until un-attributed files of the plurality of executable files do not contain any repeat sequences of commands; and in response to presence of un-attributed files of the plurality of executable files, attributing each of the un-attributed files of the plurality of executable files to a separate family.

In some implementations of the method, the method further comprises determining the predetermined length of a given repeat sequence based on a number of sample codes where the given sequence was detected.

In some implementations of the method, the predetermined length of a given repeat sequence is fixed.

In some implementations of the method, the detecting the repeat sequences further comprises determining a respective entropy value of each one of the repeat sequences and selecting only those thereof for further processing whose respective entropy values exceed a predetermined entropy value threshold.

In some implementations of the method, the at least one frequently occurring sequence is determined by searching therefor in a hash table.

In some implementations of the method, the attributing the given one of the plurality of executable files to the respective family is based on a result of calculating, for the respective sample code, a respective value of a weighting function comprising a sum of coefficients associated with each one of at least two frequently occurring sequences of commands detected in the respective sample code.

In some implementations of the method, each coefficient of the weighing function is calculated as a respective ratio of a number of executable files where a given frequently occurring sequence is present at least once, to a total number of executable files in the plurality of executable files.

In some implementations of the method, executable files not containing any repeat sequences are not attributed to any family.

In accordance with a third broad aspect of the present technology, there is provided a system for clustering executable files. The system comprises: a processor and a non-transitory computer readable medium storing instructions. The processor, upon executing the instructions, is configured to: obtain a plurality of executable files; determine a file format of each executable file of the plurality of executable files; for each file format: (i) detect repeat sequences of commands of a predetermined length in a given one of the plurality of executable files; (ii) determine at least one frequently occurring sequence of the repeat sequences of commands in the given one of the plurality of executable files; and based on the at least one frequently occurring sequence of commands, attribute the given one of the plurality of executable files to a respective family; iteratively execute the detecting, the determining, and attributing until one of: all of the plurality of executable files are attributed to at least one respective family, and until un-attributed files of the plurality of executable files do not contain any repeat sequences of commands; and in response to presence of un-attributed files of the plurality of executable files, attribute each of the un-attributed files of the plurality of executable files to a separate family.

In accordance with a fourth broad aspect of the present technology, there is provided a system for clustering executable files. The system comprises: a processor and a non-transitory computer readable medium storing instructions. The processor, upon executing the instructions, is configured to: obtain a plurality of executable files; determine a file format of each executable file of the plurality of executable files; launch, based on a respective file format, each executable file of the plurality of executable files in a respective isolated environment to determine a respective machine code of each one of the plurality of executable files; generate, based on the respective machine code, a respective sample code by deleting therefrom portions non-indicative of a given executable file being affiliated with any family; detect, in the respective sample code associated with the given executable file, repeat sequences of commands of a predetermined length; determine at least one frequently occurring sequence of the repeat sequences of commands in the respective sample code; based on the at least one frequently occurring sequence, attribute the given executable file to a respective family; iteratively execute, detecting, determining, and attributing until one of: all of the plurality of executable files are attributed to at least one respective family, and until un-attributed files of the plurality of executable files do not contain any repeat sequences of commands; and in response to presence of un-attributed files of the plurality of executable files, attribute each of the un-attributed files of the plurality of executable files to a separate family.

In the context of the present specification the term "Library functions" denotes functions that implement the most common, typical actions. Library functions are widely used by a variety of software programs, so their presence in code or in runtime processes of software is not specific for any one software, or for any specific developer.

Further, the term "Sequence length" denotes the number of commands that make up a given sequence. It is important that this number is not related to the way commands are written (in machine code and in the source code of software, different writing methods are applied), and does not depend on how many bytes are needed to write the commands that make up a sequence. In other words, the expression "sequence having a length 40" means that a given sequence consists of 40 commands. This expression does not provide any information about how many bits or bytes are needed to be written in the sequence.

The term "File clustering" denotes partitioning of an unordered plurality of files into clusters (subsets), wherein each cluster or subset corresponds to a specific software family. The task of identifying the family, that is, determining the functional purpose of the programs included in the family, in this case is not considered. The main task of clustering is to attribute each file included in the original disordered plurality to any of the families, the number of families required to cluster said plurality being unknown before clustering begins.

The term "Obfuscation" denotes modifying a code of a software program such that it may be difficult to analyze it static, to understand the algorithms of work, while preserving its functionality.

The term "Software family" refers to a plurality of software programs united by one functional purpose (for example, encrypters, loaders, etc.) and/or a common team of developers, as well as a basic execution algorithm. The software programs that make up one family differ from each other in various kinds of modifications, as a result of which their well-known characteristics, such as checksum, file size, file name, etc. are different. However, all software programs included into one family are intended for the same purpose, and all of them perform the same basic steps of the algorithm to achieve said purpose. Within the scope of this disclosure, it is assumed that software programs having an identical functional purpose, but different formats, are affiliated to different families, for example, PE encrypters and Mach-O encrypters are not one family, but two different families.

The term "Sequence" denotes a sequence, a chain of commands following one another in the source or machine code of a given executable file. Further, each command itself may have a rather complex structure, consist of, for example, an action and one or more arguments. Commands may have different lengths, typically expressed by the number of bytes required to write same. As already mentioned, the length of the sequence does not depend on the length of its constituent commands; the length of the sequence is expressed not in bits or bytes, but in units. When referring to, for example, a sequence having a length 50, it is implied that this sequence is a sequence of 50 consecutive commands.

The term "Sample" denotes non-functional portion of the given executable file, such as a file including a software program code, used only for analyzing. From the source file of a software program, the file being ready for launch and execution, a sample can be obtained by removing from said file various pieces of code that are not of interest for the purposes of the analysis. For example, a sample may be obtained from a source code of the given executable file by removing therefrom library functions and stable structures non-indicative of any software family.

The term "Stable structures" denotes code fragments that may be found in a wide variety of software programs. These portions of the source code of the given executable file are typically non-indicative of affiliation thereof with any software family. Such structures are found not only in software of a certain purpose or a certain author, but almost everywhere. Exemplary stable structures are, for example, prologs of functions.

The term "Function" denote a code fragment that may be accessed from another place in the software program. Typically, an identifier (name) is associated with the function. The name of the function is inextricably linked to the address of the first instruction (of a statement) included in the function, which takes control when calling the function. After performing the function, the control is returned back to the return address, that is, the point of the program where the given function was called.

Further, in the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented to explain the essence of the technology and are not limiting the scope thereof in any way, where.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to a computer-implemented method and a system for clustering executable files.

First Method

Figure 1A:
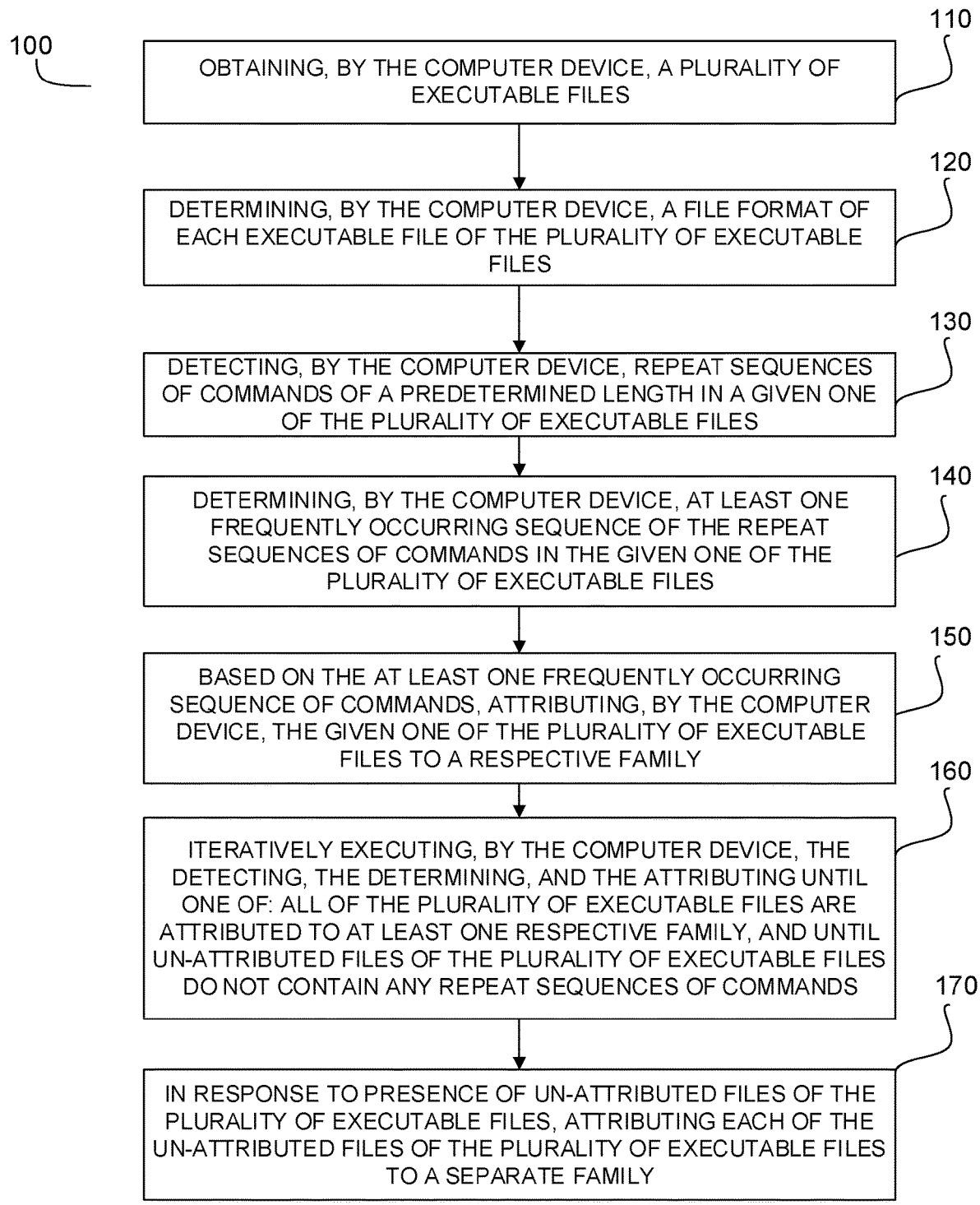
FIGS. 1A and 1B depict a flowchart diagram of one method of clustering executable files, in accordance with certain non-limiting embodiments of the present technology.

With initial reference to FIG. 1A, there is depicted a flowchart diagram of a first method 100 for clustering executable files, in accordance with certain non-limiting embodiments of the present technology. The first method 100 may be executed, for example, by a processor 401 of a computer device 400 that will be described below with reference to FIG. 4.

STEP 110: OBTAINING, BY THE COMPUTER DEVICE, A PLURALITY OF EXECUTABLE FILES

The first method 100 begins at step (110) where the processor 401 can be configured to obtain a plurality of executable files for further analysis. In some non-limiting embodiments of the present technology, each one of the plurality of executable files may be already compiled, such as, without limitation, EXE or DLL files comprising a program or dynamic library, electronic document files with an embedded scripting language (e. g., VBA language) such as DOC or XLS files, and files comprising the source code of programs in any interpreted programming languages, for example, such as JavaScript, Python, etc. In all of these files, or in some portion thereof, fragments of code or data may also be further encrypted, all of these files or at least a portion thereof may further be obfuscated, including using leak-resistant algorithms.

It should be understood that a given executable file may relate to any known format, not limited to the PE format only; for example, it may further be, without limitation, Mach-O, ELF, COM, COFF executable files, and others.

The first method 100 thus advances to step 120.

STEP 120: DETERMINING, BY THE COMPUTER DEVICE, A FILE FORMAT OF EACH EXECUTABLE FILE OF THE PLURALITY OF EXECUTABLE FILES

Next, at step (120), the processor 401 can be configured to determine a respective file format of each executable file of the plurality of executable files. Further, based on the so determined respective file format, in some non-limiting embodiments of the present technology, the processor 401 can be configured to select a corresponding code analysis tool.

It is not limited how the processor 401 can be configured to determine the respective file format; and may comprise, for example, using a preconfigured script that alternately compares a signature of the given executable file with known signatures of various file formats and, when the signatures match, generates a message including an indication of an actual file format of the given executable file (which in general may differ from the format associated in the operating system used with the given file extension). For executable files including source code in one of the interpreted programming languages, at the same step, the processor 401 can be configured to determine respective programming languages on which the source code is written, and further determine the corresponding code analysis tool. The processor 401 can be configured to determine respective programming languages, for example, by means of the Linguist software program (https://github.com/github/linguist) or by means of the Ohcount software program (https://github.com/blackducksoftware/ohcount).

The first method 100 thus proceeds to step 130.

STEP 130: DETECTING, BY THE COMPUTER DEVICE, REPEAT SEQUENCES OF COMMANDS OF A PREDETERMINED LENGTH IN A GIVEN ONE OF THE PLURALITY OF EXECUTABLE FILES

Figure 1B:
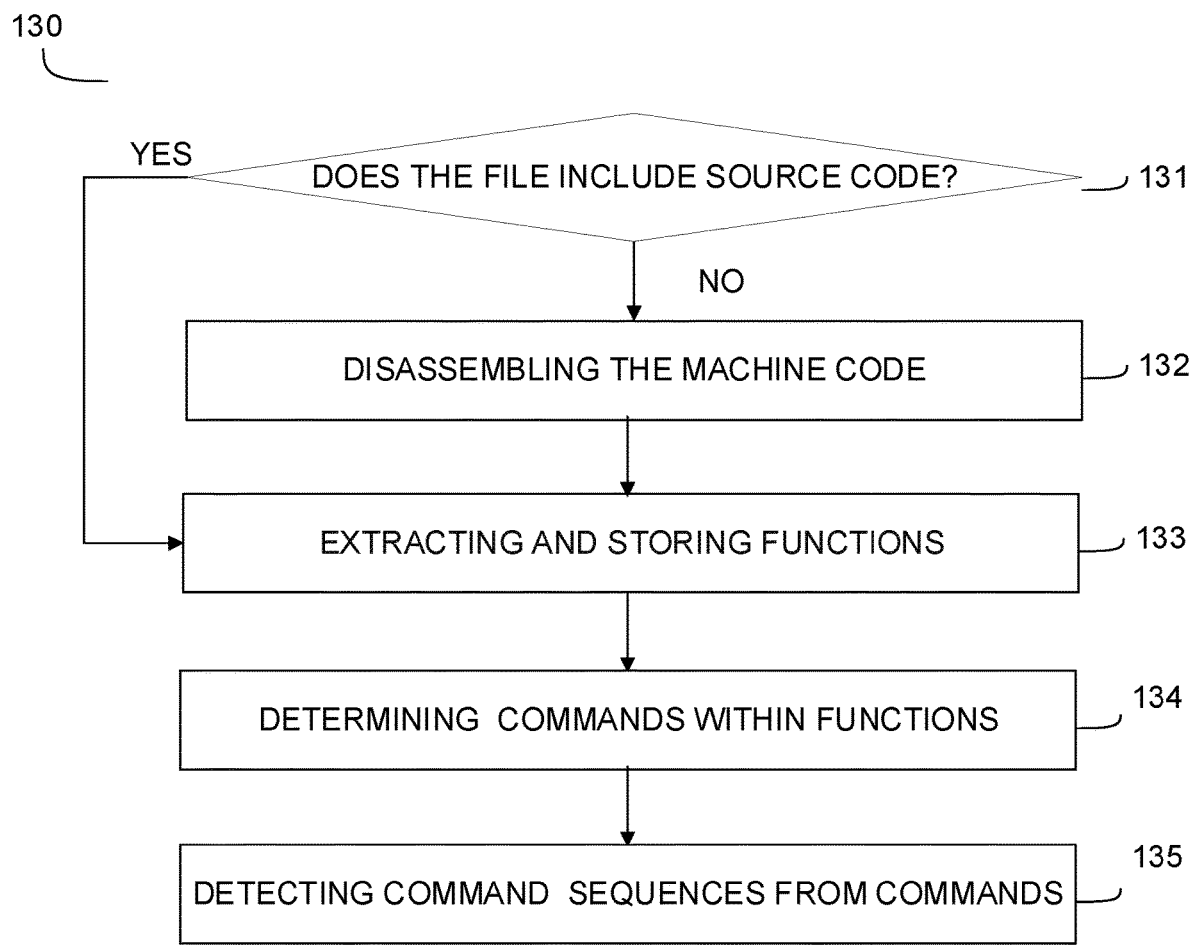

At step (130), the processor 401 can be configured to detect repeat command sequences of a predetermined length in each one of the plurality of executable files. This step will now be described in greater detail with reference to FIG. 1B, in accordance with certain non-limiting embodiments of the present technology.

The step 130 begins at sub-step (131) where, depending on whether the given executable file includes the source code or not, the processor 401 can be configured to determine further respective actions.

Thus, in some non-limiting embodiments of the present technology, in response to the given executable file including a source code, the processor 401 can be configured to advance to sub-step (133).

In response to the given executable file not including the source code, and thus including a machine code instead, the processor 401 is configured to proceed to sub-step (132) where, according to certain non-limiting embodiments of the present technology, the processor 401 can be configured to disassemble the machine code associated with the given executable file. In some non-limiting embodiments of the present technology, the processor 401 can be configured to disassemble the machine code by using a specialized disassembler program that can be pre-configured to convert the machine or operation code into a set of instructions in the Assembler language or IL language. The disassembler program may be any known disassembler program, such as IDA Pro, Sourser or other. The given software program may be pre-configured to provide marking in the machine code such that the boundaries of the functions therein.

The step 130 then advances to sub-step (133) where the processor 401 can be configured to extract functions associated with the given executable file from one of the source code and the machine code as described above. To that end, the processor 401 can be configured to have access to the corresponding code analysis tool selected for the respective file format associated with the given executable file at step (120). In some non-limiting embodiments of the present technology, the corresponding code analysis tool can be a parser program, the algorithm of which, in the case of the source code, is based on the syntax of the programming language in which the source code associated with the given executable file has been written. In case of the machine code, a parser program is used, the algorithm of which is based on a specification of the computing architecture associated with the given executable file.

Further, the processor 401 can be configured to store all code located within the function boundaries identified by the disassembler program, for example, in the form of a separate file having a text format. All the rest code (remaining outside these boundaries) in the described method is considered program data and is not used.

The same applies to the analysis of the given executable file represented the source code thereof. Using the parser, the processor 401 can be configured to determine boundaries in the analyzed source code; the fragments of the source code within said boundaries can further be identified as being the functions. To this end, for example, the well-known fact that in most high-level programming languages, the function body is included into a block statement may be used. Accordingly, one of the possible algorithms for the parser may be to identify pairs of words or symbols in code, which are used to denote a block statement in the syntax of a given language, to further verify the fact that the found block statement comprises the function body, as well as the movement of the code that makes up the body of the found function to the file where the processing results are stored. The fact that the block statement comprises exactly a function body may be checked, by the processor 401, for example, by searching, in the string preceding the opening of the block statement, for a symbolic expression corresponding to the function name in the syntax of the given programming language.

Alternatively, if the source code is written in a C-like programming language, such as JavaScript, then each function will start with a function header having a known format. For example, in the code of the example below, written in JavaScript, the header of each of the two functions may be identified, by the processor 401, based on the presence of the keyword "function". The header in such a source code will be followed by the function body, the function body being also included in the block statement specified below by a pair of curly brackets, {and}:

```
...
function disable Security ( ){
    if(WScript.Arguments.Named.Exists("elevated") = true) {
      var oReg = GetObject("winmgmts:
(impersonationLevel=impersonate)!\\\.\\root\\default:StdRegProv");
        oReg.SetDwordValue(0x80000002,
"SOFTWARE\\Microsoft\\Windows\\CurrentVersion\\Policies\\System", "EnableLUA", 0);
        oReg.SetDwordValue(0x80000002,
"SOFTWARE\\Microsoft\\Windows\\CurrentVersion\\Policies\\System", "ConsentPrompt",
0);
        oReg = null;
    }
}
Function chr(code){
   return String.fromCharCode(code);
}
...
```

The processor 401 can further be configured to determine further actions on the source code remaining outside of block statements (i.e., function boundaries) depending on whether the syntax of the respective programming language allows code execution beyond functions. For example, for the source code written in C or C#, the processor 401 can be configured to ignore the code beyond the above-determined boundaries. In this example, in the source code written in JavaScript, such code is considered to be related to another function that is separate from all other functions that have been already identified. The source code of this function is also transferred to the list of functions and then processed in the same fashion as the rest of the code placed in this list.

Thus, at sub-step (133), the processor 401 can be configured to obtain and store all functions associated with the given executable file in a separate file.

The step 130 then advances to sub-step (134) where the processor 401 can be configured to analyze the file including the above-identified functions associated with the given executable file to isolate therein separate commands. According to certain non-limiting embodiments of the present technology, to select respective commands associated with a given function of the given executable file, the processor 401 can be configured to use results of the disassembling performed previously as described with respect to sub-step 132. For example, when disassembling the following fragment of the machine code

... D6 00 C7 05 3C 3F 42 00 00 00 01 00 FF 00    (2)

the processor 401 can be configured to identify a following command, for example, using an IDA Pro program:

mov dword_423 F3C,10000h    (3)

which can be represented, in the machine code, as follows

C7 05 3C 3F 42 00 00 00 01 00    (4)

The processor 401 can be configured to perform this analysis in any fashion that allows to obtain the given result, for example, using a script written specifically for this purpose. The algorithm of such a script may be configured to parse a portion of the machine code being analyzed according to the specification of the architecture used; in this example, it is the x86 architecture.

Thus, in some non-limiting embodiments of the present technology, the processor 401 can be configured to store fragments identified in the machine code, corresponding to the respective commands of the given functions of the given executable file, for example, each on a separate line of a text file. In some non-limiting embodiments of the present technology, the processor 401 can be configured to consider as a command and further store arguments such as argument 10000 h. In other non-limiting embodiments of the present technology, the processor 401 can be configured to ignore the arguments and only store commands, such as the mov dword_423F3C command, as an example.

How the processor 401 can be configured to identify a given command when analyzing the source code depends on the syntax of the respective programming language in which the source code in question has been written. Accordingly, in some non-limiting embodiments of the present technology, the processor 401 can be configured to determine the beginning of the given command as the beginning of a line in the source code, and determine the end thereof as a symbol closest to the beginning of the line denoting the end of the command in the respective programming language, such as the "semicolon" symbol (;) in the C language, as an example.

In other non-limiting embodiments of the present technology, the processor 401 can be configured to identify the given command as being a symbolic sequence located on a separate line of the source code. Referring back to the example of the source code developed in JavaScript given above, in the function disableSecurity the processor 401 can be configured to identify six commands:

```
...
if(WScript.Arguments.Named.Exists("elevated") = true) {
var oReg = GetObject("winmgmts:
(impersonationLevel=impersonate)!\\\\.\\root\\default:StdRegProv");
oReg.SetDwordValue(0x80000002,
"SOFTWARE\\Microsoft\\Windows\\CurrentVersion\\Policies\\System", "EnableLUA", 0);
oReg.SetDwordValue(0x80000002,
"SOFTWARE\\Microsoft\\Windows\\CurrentVersion\\Policies\\System", "ConsentPrompt",
0);
oReg = null;
return filesystemobj.getFile(path).shortPath;
...
```

Similar to the machine code analysis described above, the processor 401 can further be configured to store fragments corresponding to the respective individual commands associated with each functions of the given executable file, for example, each on a separate line of a text file.

Further, the method advances to sub-step (135), wherein the processor 401 can be configured to identify command sequences of so identified commands of the predetermined length with a predetermined increment.

A command sequence, as used in the present disclosure, refers to a sequence or a "chain" of commands which follow one another in the source or machine code associated with the given executable file. It should be understood that, depending on whether the source code or the machine code is analyzed, the commands may be of a sufficiently complex structure and of different lengths, as well as include different arguments, modifiers, and so forth. All these circumstances are not taken into account when forming sequences.

Thus, in some non-limiting embodiments of the present technology, the commands may be pre-converted to numbers for convenience. This may be done, for example, by the processor 401 configured to take a hash function from the full text of each command, or by any other method of converting a line to a number. It should be understood that the same commands are converted into the same numbers. Further, to that end, the processor 401 can be configured to have access to a respective conversion algorithm such that commands, the text of which differs slightly, will be converted into numbers similar in absolute value. For example, the processor 401 can be configured to use an SSDeep hashing algorithm.

To simplify the example explaining how the processor 401 can be configured to identify command sequences, let us conditionally designate individual commands with the letters of the alphabet, wherein we will assume that each command is denoted by one letter, and same commands are denoted by the same letters. Naturally, ipso facto, the number of commands that may be extracted from the given executable file significantly exceeds the number of letters of any alphabet. Accordingly, in this example, as a result of the above sub-step (134), the processor 401 can be configured to obtain the following set of commands for the given executable file:

$$ABCDEFDEAAJHIJKIBLAMNOPQRDDA\ldots APSXYZ \tag{6}$$

Further, the processor 401 can be configured to determine a command sequences of a length 5 from the set above in increment 1.

It should be noted that the predetermined length of the command sequence does not depend on the length or other parameters of its constituent commands; the length of the sequence is expressed not in bits or bytes, but in units. For example, the command sequence having a length 5 means that this command sequence consists of five consecutive commands.

Further, according to certain non-limiting embodiments of the present technology, the predetermined increment defines by how many commands the beginning of each next command sequence will be separated from the beginning of the previous sequence. Referring back to the example (6), with an increment equal to 1, the first command sequence will start with the command A, and the second command sequence will start with the command B. With an increment equal to 2, the second command sequence will start with the command C, with an increment equal to 3, the second command sequence will start with the command D, and so forth.

Under the predetermined conditions (length 5, step 1) from the set of commands (6), the processor 401 can be configured to generate and store, for example, in a database, the following command sequences:

ABCDE

BCDEF

CDEFD

DEFDE

EFDEA

. . .

APSXY

PSXYZ (7)

The command sequence forming conditions, the predetermined length and the predetermined increment may be constant values and may have been set in advance, at the stage of developing a system implementing one of the disclosed methods, as an example. In other non-limiting embodiments of the present technology, the predetermined length of the given command sequence and the predetermined increment of formation thereof may be automatically determined, by the processor 401, depending on the fulfillment of predetermined conditions. For example, the predetermined length of the given command sequence of 100 commands was initially set, and during the analysis of the obtained sample of files, the processor 401 can identify no repeat sequences in the obtained sample of files of such a predetermined length, that is, there is no command sequence that would be present in at least two different files. Then the processor 401 can be configured to reduce the predetermined length of the given command sequence to 90 commands, re-form the command sequences, and check whether at least one sequence repeating in the two or more files.

Alternatively, if the processor 401 initially sets the predetermined length to be 100 commands, and during the analysis of the obtained sample of executable files, the processor 401 has determined that one of the command sequences is present in all executable files, the processor 401 can be configured to automatically increase the predetermined length of the command sequences to 110 commands, as an example, after which re-form the command sequences, and check that none of the command sequences is present in all executable files of the plurality of executable files.

In yet other non-limiting embodiments of the present technology, if the described requirements for the frequency of the sequence are not met, the processor 401 can be configured to increase or decrease the predetermined increment. Also, the predetermined increment and the predetermined length can be changed simultaneously, such as increased or decreased.

In additional non-limiting embodiments of the present technology, at sub-step (135), the processor 401 can further be configured to determine a respective entropy of each formed command sequence, and store only those command sequences in the database whose respective entropy values exceed a predetermined entropy threshold. Such a check aims at excluding, from processing, command sequences having too many repeat commands. Further, according to some non-limiting embodiments, the processor 401 can be configured to determine the respective entropy value according to Shannon's equation:

$$H(x) = -\sum_{i=1}^{n} p_i \log_2 p_i, \tag{8}$$

where n is a number of commands (length) in the given command sequence, and pi is a respective probability value of presence of a certain command in the i-th position within the given command sequence.

Examples of command sequences provided above at (7) demonstrate that the respective entropy values of command sequences with no repeat commands, for example, the command sequence AB CD E, will be higher than that of command sequences with repeat commands, as, for example, the command sequence D E F D E.

In yet other non-limiting embodiments of the present technology, at sub-step (135), the processor 401 can be configured to select for further processing and thus store only those command sequences whose respective entropy values are greater than a first predetermined entropy threshold, but less than a second predetermined entropy threshold. Thus, the processor 401 can be configured to select and store command sequences that have a number of repeat commands, but only those where said number does not exceed a given predetermined value.

It should be noted that at sub-step (135), for each command sequence, the processor 401 can further be configured to associate and thus store in the database a reference to the given executable file from which the respective command sequence has been identified, for example, by specifying the file name or the full path to the file, also including the name and extension thereof.

Thus, according to certain non-limiting embodiments of the present technology, at sub-step (135), the processor 401 can be configured to generate the database, wherein, separately for each executable file of the plurality of executable files obtained at step (110), all detected command sequences in the given executable file meeting one of the entropy requirements as described above are stored. In other non-limiting embodiments of the present technology, the processor 401 may not be configured to determine the respective entropy values of the command sequences, and thus would store in the database only the command sequences without their respective entropy values. It should be expressly understood that the database storing the command sequences may be configured in any suitable manner, for example, it may be a hash table or any other known data structure that implements the interface of the associative array and allows storing sequence-value pairs, wherein the value field is intended to store a numerical value.

The step (130) thus terminates, and referring back to FIG. 1A, the first method 100 further advances to step (140).

STEP 140: DETERMINING, BY THE COMPUTER DEVICE, AT LEAST ONE FREQUENTLY OCCURRING SEQUENCE OF THE REPEAT SEQUENCES OF COMMANDS IN THE GIVEN ONE OF THE PLURALITY OF EXECUTABLE FILES

At step (140), the processor 401 can be configured to determine at least one frequently occurring command sequence amongst repeat command sequences identified at the step 130. In some non-limiting embodiments of the present technology, the at least one frequently occurring command sequence can be a most frequently occurring sequence amongst the respective command sequences associated with the given executable file. To that end, the processor 401 can be configured, for example, first, count each further command sequence from a common plurality of command sequences in terms of occurrence thereof in the plurality of executable files; the counted number is stored in the field "value" corresponding to a given command sequence in the database. Then, when the calculation for all the sequences is completed, the processor 401 can be configured to determine the actual occurrence of each command sequence, that is, a ratio of a number of occurrences of the given command sequence L to a total number of command sequences K. This parameter can be both less than one, if the given command sequence does not occur in every executable file, and more than one, if the given command sequence occurs, on average, several times throughout each file:

$$\lambda = L/K \quad (9)$$

The processor 401 can be configured to store the respective occurrence value associated with each command sequence in the database, in the field "value" corresponding to the given command sequence.

Th first method 100 thus advances to step (150).

STEP 150: BASED ON THE AT LEAST ONE FREQUENTLY OCCURRING SEQUENCE OF COMMANDS, ATTRIBUTING, BY THE COMPUTER DEVICE, THE GIVEN ONE OF THE PLURALITY OF EXECUTABLE FILES TO A RESPECTIVE FAMILY

At step (150), the processor 401 can be configured to attribute all executable files of the plurality of executable files including the at least one frequently occurring command sequence to a same respective software family. To that end, the processor 410 can be configured to search hash table or apply certain machine learning techniques, and so forth, as an example.

At this step, the processor 401 can be configured to select one or more of command sequences having largest numerical occurrence value. Since the database stores for each command sequence also a reference to the respective executable file from which it was obtained, the processor 401 can be configured to determine in which executable files of the plurality of executable files obtained at step (110) said one or more command sequences occur. The processor 401 can thus be configured to determine these files as being affiliated with the same respective software family.

In alternative non-limiting embodiments of the present technology, the processor 401 can be configured to attribute the given executable file to the respective software family by applying a weighing function of the form F (A, B, C, D, E, k1, k2, k3, k4, k5), where A . . . E. We are five most frequently occurring command sequences, and k1 . . . k5 are coefficients denoting the respective occurrence values of each of these command sequences. If a respective value F is higher than a predetermined threshold value, the processor 401 can be configured to attribute the given executable file to the respective software family. In other non-limiting embodiments of the present technology, a different number of most frequently occurring command sequences are considered, for example, without limitation, two, three, and so forth.

Further, in some non-limiting embodiments of the present technology, the processor 401 can be configured to determine the respective value of the weighing function F, for example, in accordance with a following equation:

$$F = k1*\text{bin}(A) + k2*\text{bin}(B) + k3*\text{bin}(C) + k4*\text{bin}(D) + k5*\text{bin}(E), \quad (10)$$

where bin(A) is a binary value equal to 1 if the command sequence A is found in the given executable file, and equal to 0 if not, bin (B) is a similar value for the command sequence B, etc.

In some non-limiting embodiments of the present technology, the processor 401 can be configured to determine the coefficients k1 . . . k5 as the respective occurrence values of the given command sequence as described with respect to equation (9). In other non-limiting embodiments of the present technology, the processor 401 can be configured to determine the coefficients as a ratio of a number of executable files, wherein the given command sequence is present at least once, to the total number of executable files in the plurality of executable files obtained at step (110). Any other variants for calculating the respective value of the function F are also possible, that consider the contribution of each of the coefficients and the presence of specific sequences in the given executable file.

For example, attributing executable file of the plurality of executable files to the respective family may mean, for example, creating a separate folder and copying the corresponding executable files to said folder. In alterative non-limiting embodiments of the present technology, a text file storing a general list of names of executable files from the plurality of executable files obtained at step (110), opposite the names of executable files determined to be affiliated with the respective family, includes a marking, for example, "Family 1". Any alternative implementations of this step are also possible, allowing to refer to the fact that the specific files included in the original plurality of executable files are attributed to one family.

The first method 100 thus proceeds to step 160.

STEP 160: ITERATIVELY EXECUTING, BY THE COMPUTER DEVICE, THE DETECTING, THE DETERMINING, AND THE ATTRIBUTING UNTIL ONE OF: ALL OF THE PLURALITY OF EXECUTABLE FILES ARE ATTRIBUTED TO AT LEAST ONE RESPECTIVE FAM-

ILY, AND UNTIL UN-ATTRIBUTED FILES OF THE PLURALITY OF EXECUTABLE FILES DO NOT CONTAIN ANY REPEAT SEQUENCES OF COMMANDS

At step (160), the processor 401 can be configured to exclude all files attributed to a given software family from further processing. As described above, at step (150), the processor 401 is configured to conduct an analysis on the database that stores the command sequences determined at step (140) and the corresponding numerical parameters indicative of occurrence thereof. Therefore, the exclusion, from further processing, of executable files attributed to one family may technically mean, for example, exclusion, from the database, of those command sequences for which the database stores references to said executable files.

In other non-limiting embodiments of the present technology, numerical values indicative of occurrence of the command sequences may be nullified in the database for those command sequences that are associated with the executable files to be excluded.

Further, having excluded the previously attributed executable files from the database, the processor 401 can be configured to repeat the search for further frequently occurring sequences, attributing the associated executable files based on the further frequently occurring sequence to other respective software families and further excluding from the so attributed executable files at the current interaction from further processing until all files in the plurality of executable files are attributed to at least one family, or until remaining executable files do not include any repeat command sequences.

In other words, the processor 401 can be configured to iteratively execute steps (150) and (160) described above until all files from the plurality of executable files obtained at step (110) are attributed to tat least one respective family.

The first method 100 hence advances to step 170.
STEP 170: IN RESPONSE TO PRESENCE OF UN-ATTRIBUTED FILES OF THE PLURALITY OF EXECUTABLE FILES, ATTRIBUTING EACH OF THE UN-ATTRIBUTED FILES OF THE PLURALITY OF EXECUTABLE FILES TO A SEPARATE FAMILY At step (170), the processor 401 can be configured to attribute each of the remaining files with no repeat command sequences to a separate family. In other words, at step (170), the processor 401 can be configured to create as many new software families as the number of remaining files without repeat command sequences and attribute each one of the remaining files to a respective one of said new families.

The first method 100 thus terminates.
Second Method

Figure 2A:
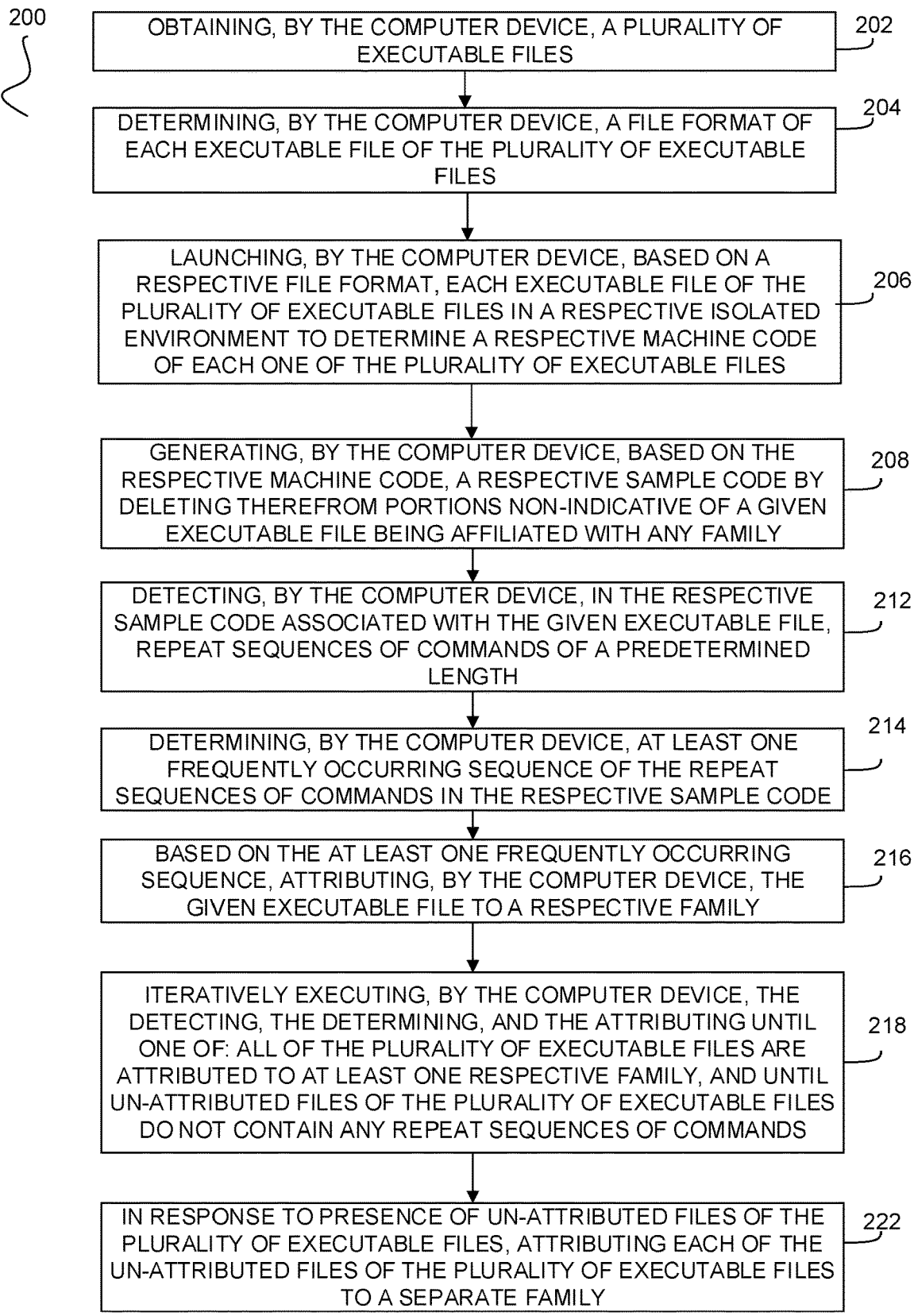
FIGS. 2A and 2B depict another method of clustering executable files, in accordance with certain non-limiting embodiments of the present technology.

In alternative non-limiting embodiments of the present technology, for clustering the executable files, the processor 401 can be configured to execute a second method 200, a flowchart of which is depicted in FIGS. 2A-and 2B.
STEP 202: OBTAINING, BY THE COMPUTER DEVICE, A PLURALITY OF EXECUTABLE FILES The second method 200 begins at step (202) wherein the processor 401 can be configured to obtain a plurality of executable files to be analyzed. As it can be appreciated, the processor 401 can be configured to execute step (202) similar to step (110) described above; thus, the plurality of executable file for implementing the second 200 may include already compiled files, such as EXE or DLL files comprising a program or dynamic library, electronic document files with an embedded scripting language (e. g., VBA language) such as DOC or XLS files, and files comprising the source code of programs in any interpreted programming languages, for example, such as JavaScript, Python, etc. In all of these files, or in some portion thereof, fragments of code or data may also be further encrypted, all of these files or portion thereof may further be obfuscated, including using leak-resistant algorithms. Executable files may relate to any known format, not limited to the PE format only; for example, they may further be, without limitation, Mach-O, ELF, COM, COFF executable files, and others.

The second method (200) then advances to step (204).
STEP 204: DETERMINING, BY THE COMPUTER DEVICE, A FILE FORMAT OF EACH EXECUTABLE FILE OF THE PLURALITY OF EXECUTABLE FILES At step (204), the processor 401 can be configured to determine respective file formats of each executable file of the plurality of executable files. Further, based on the so determined file formats, the processor 401 can be configured to select a code analysis tool corresponding to the format. This is performed in a completely similar manner to step (120) of the first method 100 described above.

After step (204), the second method (200) advances to step (206).
STEP 206: LAUNCHING, BY THE COMPUTER DEVICE, BASED ON A RESPECTIVE FILE FORMAT, EACH EXECUTABLE FILE OF THE PLURALITY OF EXECUTABLE FILES IN A RESPECTIVE ISOLATED ENVIRONMENT TO DETERMINE A RESPECTIVE MACHINE CODE OF EACH ONE OF THE PLURALITY OF EXECUTABLE FILES At step (206), according to certain non-limiting embodiments of the present technology, the processor 401 can be configured to launch each executable file of the plurality of executable files obtained at step (202) in a respective isolated environment corresponding to the respective file format thereof. In these embodiments, the respective isolated environment may be any suitable program environment for launching the given executable file. The processor 401 can be configured to select the respective isolated environment automatically based on the respective file format information obtained at step (204).

Thereafter, the second method 200 advances to step (208).
STEP 208: GENERATING, BY THE COMPUTER DEVICE, BASED ON THE RESPECTIVE MACHINE CODE, A RESPECTIVE SAMPLE CODE BY DELETING THEREFROM PORTIONS NON-INDICATIVE OF A GIVEN EXECUTABLE FILE BEING AFFILIATED WITH ANY FAMILY At step (208), according to certain non-limiting embodiments of the present technology, the processor 401 can be configured to generate, based on the given executable file, a respective sample therefrom. As used herein, the respective sample is a non-functional portion of the given executable file and is used only for analysis. Step (208) will be described in detail below with reference to FIG. 2B.

Figure 2B:
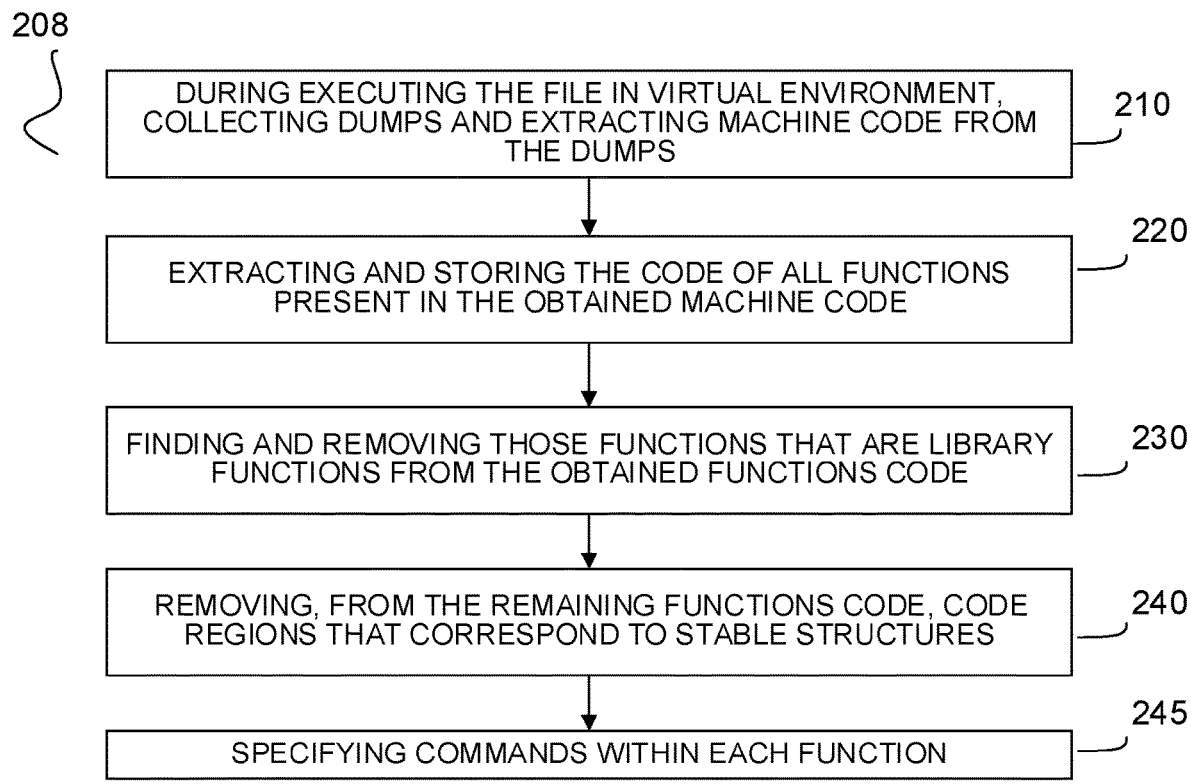

As best shown in FIG. 2B, step (208) begins at sub-step (210) where the processor 401 can be configured to collect memory dumps and extract respective machine code therefrom during the execution of the given executable file in the respective isolated environment. Accordingly, executing the given executable file in the respective isolated environment, the processor 401 can be configured to receive one or more memory dumps generated in response to the executing the given executable file. Broadly speaking, a given memory dump is a "footprint" of the given executable file, executed by the processor 401, left on a runtime memory of the respective isolated environment. Thus, the given memory dump can include machine code of a plurality of commands associated with the given executable file. In some non-limiting embodiments of the present technology, such memory dumps could be generated with a relatively high frequency, for example, one per each clock cycle of the processor 401 of the computer device 400, which may further enable to receive more detailed data on the given executable file and the machine code contained therein.

In some non-limiting embodiments of the present technology, to receive the one or more memory dumps, the processor 401 can be configured to use a specifically pre-configured application therefor. For example, and not as a limitation, the processor 401 can be configured to apply a ProcDump™ utility.

As each memory dump is representative of a respective portion of the machine code located in the runtime memory at a moment of its generation, the processor 401 can thus be configured to restore the machine code based on the one or more memory dumps generated in response to the executing the given executable file in the respective isolated program environment. Therefore, using the runtime memory as a data source, the processor 401 can be configured to receive a "clean" version of the machine code before having been processed by one of the encryption, the compression, the obfuscation, and the like.

Further, the processor 401 can be configured to store the machine code extracted from the memory dumps, for example, as a text format file. This completes sub-step (210).

The second method 200 hence advances to sub-step (220) where the processor 401 can be configured to extract, from the so restored machine code associated with the given executable file, and store code portions of all functions contained therein. This may be performed, in some non-limiting embodiments of the present technology, by a disassembler software program, as well as a parser software program, the algorithm of which is based on the specification of a computing architecture, such as, for example, the x86 architecture, corresponding to the given executable file.

How the processor 401 can further be configured to extract the functions from the machine code and store same, such as in a list, is not limited and may be implemented in a manner similar to sub-step (133) described above with respect to the first method 100. Further, the processor 401 can be configured to store the list of the so extracted functions in a separate file.

The second method 200 thus advances to sub-step 230 where the processor 401 can be configured to remove machine code portions that are non-indictive of the given executable file being affiliated with any software family. In some non-limiting embodiments of the present technology, such machine code portions may be representative, for example, however, without limitation, of library functions. To this end, the separate file including the functions obtained at sub-step (220) is analyzed. Using the signature analysis, the processor 401 can be configured to identify the library functions and exclude them from the list of functions. As used herein, the library functions are standard tools. They are widely used by a variety of software programs, so their presence in the machine code or in runtime processes is not specific to any one specific software family. The exclusion of the library functions makes it possible to substantially simplify the analysis and further provides a better result due to the fact that only those commands that best characterize particular software will remain in the machine code.

According to certain non-limiting embodiments of the present technology, the signature analysis and the removal of the library functions can be performed by the processor 401 executing an auxiliary script software. The algorithm of this script may be, for example, an alternate comparison of each of the functions with a pre-prepared set of signatures (regular expressions). Each of these signatures corresponds to a respective library function pre-described in the form of a signature; upon detection of a given function corresponding to the respective signature, all code constituting the body and the header of such a library function can further be excluded from the file including the list of functions.

Upon completion of the script processing, the processor 401 can further be configured to store the file including the remaining functions, for example, in a form of the text of the code portions indicative of the functions present therein, the remaining functions being non-library functions.

This completes sub-step (230) and the second method 200 advances to sub-step (240) where the processor 401 can be configured to remove, from the remaining code, code portions that correspond to stable structures, that is, code fragments that equally occur in any software programs, for example, function prologs. To that end, the processor 401 can be configured to have access to a pre-configured software program.

Figure 3:
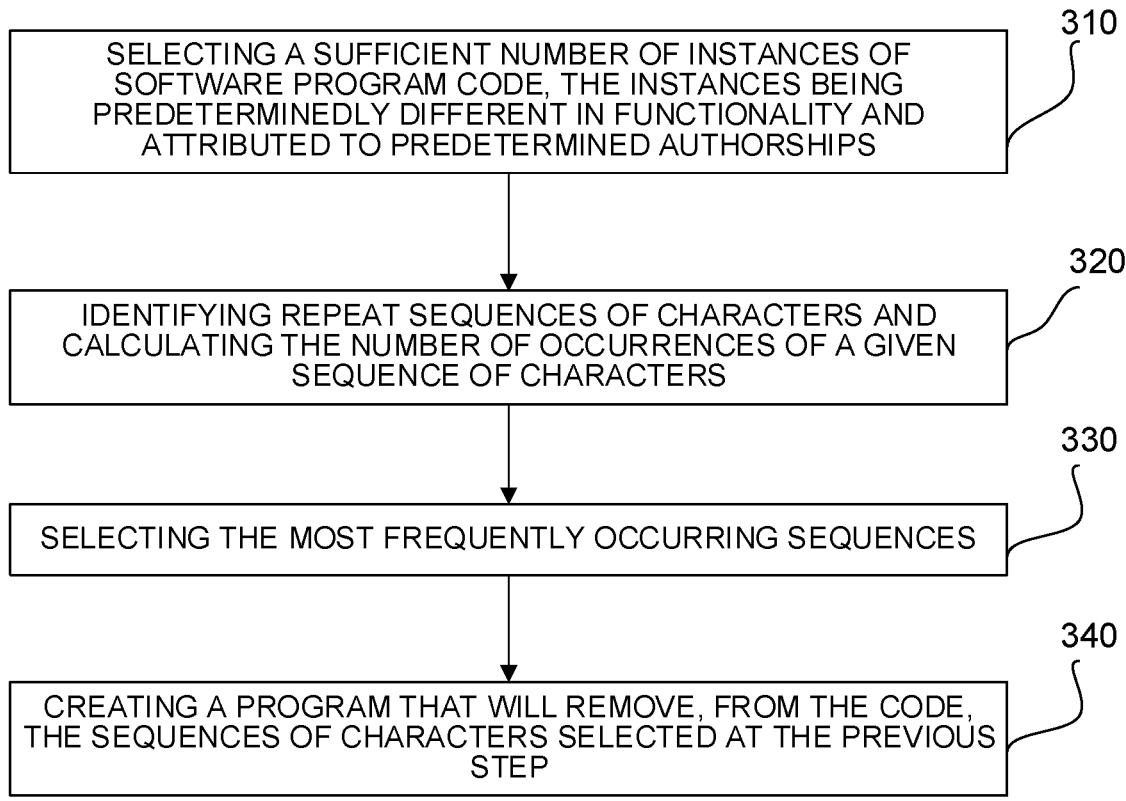
FIG. 3 depicts a flowchart diagram of a method of generating a program script for identifying portions of a given executable file inherently non-indicative of any software family, in accordance with certain non-limiting embodiments of the present technology.

With reference to FIG. 3, there is depicted a flowchart diagram of a third method 300 of generating the pre-configured software program for identifying and removing stable structures from the machine code associated with the given executable file, in accordance with certain non-limiting embodiments of the present technology. The third method 300 can also be executed by the processor 401 of the computer device 400 described below.

At step (310), the processor 401 can be configured to select a sufficient number, for example, 1000, of an auxiliary plurality of executable files and/or sample attributed to different software families. A given auxiliary sample may include both deliberately malicious software programs, for example, datastealers, loaders, worms, and deliberately legitimate ones, for example, text editors, image viewing software programs, archivers, and so on. The selection may further include electronic document files with an embedded scripting language (e.g., VBA language) such as DOC or XLS files, and files comprising the source code of programs in any interpreted programming languages, for example, such as JavaScript, Python, etc.

At step (320), the processor 401 can be configured to apply, to each one of the auxiliary plurality of executable files, an algorithm that detects repeat sequences of symbols and counts the number of occurrences of a given sequence of characters in a common code array. Further, the processor 401 can be configured to set a minimum length of the given sequence is set, which may for example, be 20 characters, and a maximum length of the given sequence to be not limited. In alternative non-limiting embodiments of the present technology, both the minimum and maximum length of the given sequence can be set, for example, to be 15 and 250 characters, respectively.

The described algorithm retrieves a list of detected repeat sequences of characters, wherein each repeat sequence is associated with a respective number of occurrences thereof in the auxiliary plurality of executable files.

Further, at step (330), the processor 401 can be configured to identify, in the list of stable sequences generated by the above algorithm, frequently occurring sequences. For example, the processor 401 can be configured to identify the frequently occurring sequences as being sequences that occur, on average, at least once in each executable file of the auxiliary plurality of executable files i.e., in this example, those that have occurred 1000 times or more.

Further, at step (340), the processor 401 can be configured generate the pre-configured software program (such as a script) allowing removing, from any code, exactly those sequences that were selected at the previous step.

Thus, the processor 401 can be configured to generate the pre-configured software program for removing stable structure, such as function prologs, or any other portions considered inherently non-indicative of any software family from the source and/or machine code associated with the given executable file.

Referring back to FIG. 2B, after processing by the pre-configured software program (300) for removing portions inherently non-indicative of any software family, at sub-step (240), the processor 401 can thus be configured to generate the file associated with the given executable files not including code portions of those functions that are frequently occurred in any randomly selected software programs.

This completes step (240) and the second method 200 thus advances to sub-step (245). At this step, the processor can be configured to analyze the file obtained at the previous step to identify respective commands within each function. In some non-limiting embodiments of the present technology, the processor 401 can be configured to execute sub-step (245) in a similar manner to the above-described sub-step (134) of the first method 100. Thus, the processor 401 can be configured to obtain, for each executable file from the plurality of executable files obtained at step (202), a respective sample wherein both library functions and stable structures are removed from the code.

Further, at sub-step (245), the processor 401 can be configured to store the so generated respective samples from each one of the plurality of executable files. It should be noted that the processor 401 can be configured to store, for example, in a database, for each sample, a reference to the respective executable file from which it was obtained, for example, by specifying the file name or the full path to the file, also including the name and extension thereof, or otherwise, in any known manner. That is, in one fashion or another, but for each sample, the processor 401 can further be configured to obtain and store information about the respective executable file the sample was obtained from.

With back reference to FIG. 2A, the second method 200 thus advances to step 212.

STEP 212: DETECTING, BY THE COMPUTER DEVICE, IN THE RESPECTIVE SAMPLE CODE ASSOCIATED WITH THE GIVEN EXECUTABLE FILE, REPEAT SEQUENCES OF COMMANDS OF A PREDETERMINED LENGTH

At step (212), the processor 401 can be configured to detect, in the respective sample associated with the given executable file, repeat command sequences of a predetermined length. The processor 401 can be configured to execute this step similarly to sub-step (135) of the first method 100, as described above with reference to FIG. 1B, with the only difference that, in this case, the command sequences are formed from respective commands following one after another in the code of the respective sample in question, and not in the code of the given executable file as a whole. In other words, step (212) comprises performing the same actions as previously described in relation to sub-step (135), but with reference to samples rather than executable files.

Thus, the processor 401 can be configured to obtain a database wherein, separately for each respective sample, all the command sequences found in a given sample meeting one of the entropy requirements described above at sub-step 135 are stored. In other non-limiting embodiments of the present technology, the respective entropy values of the command sequences are not calculated, and in the database, separately for each respective sample, all the command sequences identified therein are stored. It is understood that on the basis of this information it is possible to build an inverse relationship in any known manner, that is, to find which respective samples a given command sequence is present in.

The second method 200 thus advances to step 214.

STEP 214: DETERMINING, BY THE COMPUTER DEVICE, AT LEAST ONE FREQUENTLY OCCURRING SEQUENCE OF THE REPEAT SEQUENCES OF COMMANDS IN THE RESPECTIVE SAMPLE CODE

At step (214), similar to step (140) of the first method 100 described above, the processor 401 can be configured to determine at least one frequently occurring command sequence, that is, such a command sequence that most frequently occur in each of the respective samples associated with the plurality of executable files. The occurrence value calculated for each command sequence can further be stored, by the processor 401, in the database, in the field "value" corresponding to the given sequence.

The second method 200 hence advances to step 216.

STEP 216: BASED ON THE AT LEAST ONE FREQUENTLY OCCURRING SEQUENCE, ATTRIBUTING, BY THE COMPUTER DEVICE, THE GIVEN EXECUTABLE FILE TO A RESPECTIVE FAMILY

At step (216), the processor 401 can be configured to attribute executable files of the plurality of executable files corresponding to their samples that include the at least one frequently occurring command sequence to a same respective family. This can be done similarly to step (150) described above with respect to the first method 100, with the only difference being in that the at least one frequently occurring command sequence is determined in samples, and the executable files corresponding to these samples are attributed to the respective software families.

As described above, at this step, the processor 401 can be configured to select one or more of command sequences having the largest numerical occurrence value. Since the database stores for each command sequence also the respective reference to a sample or samples where it occurs, and for each sample at sub-step (245) a reference to the corresponding thereto file was stored, it is possible to determine which executable files of the plurality of executable files obtained at step (202) correspond to a given command sequence or several command sequences. These files are considered to constitute one family of software programs.

The second method 200 thus proceeds to step 218

STEP 218: ITERATIVELY EXECUTING, BY THE COMPUTER DEVICE, THE DETECTING, THE DETERMINING, AND THE ATTRIBUTING UNTIL ONE OF: ALL OF THE PLURALITY OF EXECUTABLE FILES ARE ATTRIBUTED TO AT LEAST ONE RESPECTIVE FAMILY, AND UNTIL UN-ATTRIBUTED FILES OF THE PLURALITY OF EXECUTABLE FILES DO NOT CONTAIN ANY REPEAT SEQUENCES OF COMMANDS

At step (218), the processor 401 can be configured to exclude the executable files and samples previously attributed to the respective given family at step 216 from further processing. Since the analysis is carried out on the database that stores created sequences and corresponding thereto numerical parameters that are indicative of occurrence thereof, the exclusion, from further processing, of samples attributed to the respective family may technically mean, for example, exclusion, from the database, of those command sequences for which the references to these samples are stored in the database.

In an alternative embodiment, numerical values indicative of occurrence may be nullified in the database for those command sequences that are associated with the samples to be excluded. As a result, the processor 401 can be configured to exclude command sequences and corresponding thereto samples from further analysis. It should also be understood that after performing this operation, the most frequently occurring sequences remaining in the database will be the command sequences having occurrence indicators following those of the recently excluded sequences.

Further, the processor 401 can be configured to (1) iteratively repeat the search for the frequently occurring command sequences, (2) attribute executable files corresponding to samples comprising further at least one frequently occurring command sequence to a further respective family, (3) and exclude the so attributed executable files and samples from yet further processing until all executable files of the plurality of executable files are attributed to at least one family, or until only those samples are left that do not include any repeat command sequences.

In other words, step (218) is an iterative combination of steps (214) and (216) described above, said steps being performed in cycles until all executable files from the plurality of executable files obtained at step (202) are attributed to the at least one family.

The second method 200 thus advances to step 222.

STEP 222: IN RESPONSE TO PRESENCE OF UN-ATTRIBUTED FILES OF THE PLURALITY OF EXECUTABLE FILES, ATTRIBUTING EACH OF THE UN-ATTRIBUTED FILES OF THE PLURALITY OF EXECUTABLE FILES TO A SEPARATE FAMILY

At step 222, if there are samples left in the plurality of samples including no repeat sequences, in some non-limiting embodiments of the present technology, the processor 401 can be configured not to attribute such un-attributed executable files associated with those respective samples to any of the families.

However, in other non-limiting embodiments of the present technology, the processor 401 can be configured to attribute the un-attributed executable files corresponding to the respective samples having no repeat command sequences to a separate family. In other words, in these embodiments, the processor 401 can be configured to determine as many new software families as the number of remaining samples having no repeat command sequences and attribute each one of the remaining files to a respective one of said new families.

Computer Device

Figure 4:
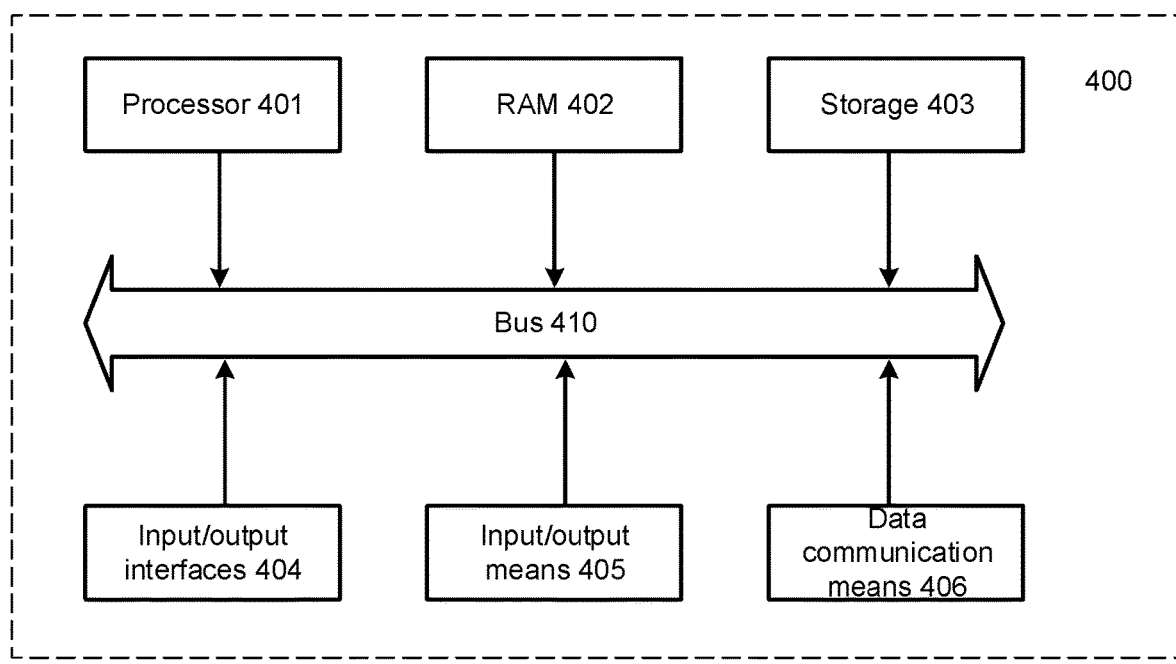
FIG. 4 depict a schematic diagram of an example computing environment configurable for execution of present method of clustering executable files of FIGS. 1A, 1B, 2A, and 2B, in accordance with certain non-limiting embodiments of the present technology.

With reference to FIG. 4, there is depicted an example functional diagram of the computer device 400 configurable to implement certain non-limiting embodiments of the present technology including the first method 100, the second method 200, and the third method 300 described above.

In some non-limiting embodiments of the present technology, the computer device 400 may include: the processor 401 comprising one or more central processing units (CPUs), at least one non-transitory computer-readable memory 402 (RAM), a storage 403, input/output interfaces 404, input/output means 405, data communication means 406.

According to some non-limiting embodiments of the present technology, the processor 401 may be configured to execute specific program instructions the computations as required for the computer device 400 to function properly or to ensure the functioning of one or more of its components. The processor 401 may further be configured to execute specific machine-readable instructions stored in the at least one non-transitory computer-readable memory 402, for example, those causing the computer device 400 to execute one of the first method 100, the second method 200, and the third method 300.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 402 may be implemented as RAM and contains the necessary program logic to provide the requisite functionality.

The storage 403 may be implemented as at least one of an HDD drive, an SSD drive, a RAID array, a network storage, a flash memory, an optical drive (such as CD, DVD, MD, Blu-ray), etc. The storage 403 may be configured for long-term storage of various data, e.g., the aforementioned documents with user data sets, databases with the time intervals measured for each user, user IDs, etc.

The input/output interfaces 404 may comprise various interfaces, such as at least one of USB, RS232, RJ45, LPT, COM, HDMI, PS/2, Lightning, FireWire, etc.

The input/output means 405 may include at least one of a keyboard, a joystick, a (touchscreen) display, a projector, a touchpad, a mouse, a trackball, a stylus, speakers, a microphone, and the like. A communication link between each one of the input/output means 405 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 406 may be selected based on a particular implementation of a network, to which the computer device 400 can have access, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of a WAN, a PAN, a LAN, an Intranet, the Internet, a WLAN, a WMAN, or a GSM network, as an example.

These and other components of the computing device 400 may be linked together using a common data bus 410.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for clustering executable files, the method comprising:
obtaining, by the computer device, a plurality of executable files;
determining a file format of each executable file of the plurality of executable files;

for each file format:
(i) detecting, by the computer device, repeat sequences of commands of a predetermined length in a given executable file of the plurality of executable files,
a given command being represented by a portion of one of a source and machine code associated with the given executable file that includes an action to be executed by the given executable file;
(ii) determining, by the computer device, at least one frequently occurring sequence of the repeat sequences of commands in the given one of the plurality of executable files; and
based on the at least one frequently occurring sequence of commands, attributing the given executable file to a respective family;
iteratively executing the detecting, the determining, and the attributing until one of: all of the plurality of executable files are attributed to at least one respective family, and until un-attributed files of the plurality of executable files do not contain any repeat sequences of commands; and
in response to presence of un-attributed files of the plurality of executable files, attributing each of the un-attributed files of the plurality of executable files to a separate family.

2. The method of claim 1, further comprising determining the predetermined length of a given repeat sequence based on a number of executable files where the given sequence was detected.

3. The method of claim 1, wherein the predetermined length of a given repeat sequence is fixed.

4. The method of claim 1, wherein the detecting the repeat sequences further comprises determining a respective entropy value of each one of the repeat sequences and selecting only those thereof for further processing whose respective entropy values exceed a predetermined entropy value threshold.

5. The method of claim 1, wherein the at least one frequently occurring sequence is determined by searching therefor in a hash table.

6. The method of claim 1, wherein the attributing the given one of the plurality of executable files to the respective family is based on a result of calculating, for the given executable file, a respective value of a weighting function comprising a sum of coefficients associated with each one of at least two frequently occurring sequences of commands detected in the given executable file.

7. The method of claim 6, wherein each coefficient of the weighing function is calculated as a respective ratio of a number of executable files where a given frequently occurring sequence is present at least once, to a total number of executable files in the plurality of executable files.

8. The method of claim 1, wherein executable files not containing any repeat sequences are not attributed to any family.

9. A method for clustering executable files, the method comprising:
obtaining a plurality of executable files;
determining a file format of each executable file of the plurality of executable files;
launching based on a respective file format, each executable file of the plurality of executable files in a respective isolated environment to determine a respective machine code of each one of the plurality of executable files;
generating based on the respective machine code, a respective sample code by deleting therefrom portions non-indicative of a given executable file being affiliated with any family;
detecting in the respective sample code associated with the given executable file, repeat sequences of commands of a predetermined length,
a given command being represented by a portion of the respective machine code associated with the given executable file that includes an action to be executed by the given executable file;
determining at least one frequently occurring sequence of the repeat sequences of commands in the respective sample code;
based on the at least one frequently occurring sequence, attributing the given executable file to a respective family;
iteratively executing the detecting, the determining, and the attributing until one of: all of the plurality of executable files are attributed to at least one respective family, and until un-attributed files of the plurality of executable files do not contain any repeat sequences of commands; and
in response to presence of un-attributed files of the plurality of executable files, attributing each of the un-attributed files of the plurality of executable files to a separate family.

10. The method of claim 9, further comprising determining the predetermined length of a given repeat sequence based on a number of sample codes where the given sequence was detected.

11. The method of claim 9, wherein the predetermined length of a given repeat sequence is fixed.

12. The method of claim 9, wherein the detecting the repeat sequences further comprises determining a respective entropy value of each one of the repeat sequences and selecting only those thereof for further processing whose respective entropy values exceed a predetermined entropy value threshold.

13. The method of claim 9, wherein the at least one frequently occurring sequence is determined by searching therefor in a hash table.

14. The method of claim 9, wherein the attributing the given one of the plurality of executable files to the respective family is based on a result of calculating, for the respective sample code, a respective value of a weighting function comprising a sum of coefficients associated with each one of at least two frequently occurring sequences of commands detected in the respective sample code.

15. The method of claim 14, wherein each coefficient of the weighing function is calculated as a respective ratio of a number of executable files where a given frequently occurring sequence is present at least once, to a total number of executable files in the plurality of executable files.

16. The method of claim 9, wherein executable files not containing any repeat sequences are not attributed to any family.

17. A system for clustering executable files comprising:
at least one processor;
at least one non-transitory computer readable medium storing instructions, which when executed by the at least one processor cause the system to:
obtain a plurality of executable files;
determine a file format of each executable file of the plurality of executable files;

for each file format:
(i) detect repeat sequences of commands of a predetermined length in a given executable file of the plurality of executable files
a given command being represented by a portion of one of a source and machine code associated with the given executable file that includes an action to be executed by the given executable file;
(ii) determine at least one frequently occurring sequence of the repeat sequences of commands in the given one of the plurality of executable files; and
based on the at least one frequently occurring sequence of commands, attribute the given executable file of the plurality of executable files to a respective family;
iteratively execute the detecting, the determining, and attributing until one of: all of the plurality of executable files are attributed to at least one respective family, and until un-attributed files of the plurality of executable files do not contain any repeat sequences of commands; and
in response to presence of un-attributed files of the plurality of executable files, attribute each of the un-attributed files of the plurality of executable files to a separate family.

18. A system for clustering executable files comprising:
at least one processor;
at least one non-transitory computer readable medium storing instructions, which when executed by the at least one processor cause the system to:
obtain a plurality of executable files;
determine a file format of each executable file of the plurality of executable files;
launch, based on a respective file format, each executable file of the plurality of executable files in a respective isolated environment to determine a respective machine code of each one of the plurality of executable files;
generate, based on the respective machine code, a respective sample code by deleting therefrom portions non-indicative of a given executable file being affiliated with any family;
detect, in the respective sample code associated with the given executable file, repeat sequences of commands of a predetermined length,
a given command being represented by a portion of the respective machine code associated with the given executable file that includes an action to be executed by the given executable file;
determine at least one frequently occurring sequence of the repeat sequences of commands in the respective sample code;
based on the at least one frequently occurring sequence, attribute the given executable file to a respective family;
iteratively execute, detecting, determining, and attributing until one of: all of the plurality of executable files are attributed to at least one respective family, and until un-attributed files of the plurality of executable files do not contain any repeat sequences of commands; and
in response to presence of un-attributed files of the plurality of executable files, attribute each of the un-attributed files of the plurality of executable files to a separate family.

\* \* \* \* \*